(12) United States Patent
Alsheikh et al.

(10) Patent No.: US 12,365,405 B2
(45) Date of Patent: Jul. 22, 2025

(54) DYNAMICALLY MAGNETIZED CHASSIS FOR CRAWLING ROBOTIC VEHICLES

(71) Applicant: Saudi Arabian Oil Company, Dhahran (SA)

(72) Inventors: Mohammed H. Alsheikh, Thuwal (SA); Abdulwahab Halawani, Thuwal (SA); Sahejad Patel, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 749 days.

(21) Appl. No.: 17/657,871

(22) Filed: Apr. 4, 2022

(65) Prior Publication Data

US 2023/0312031 A1    Oct. 5, 2023

(51) Int. Cl.
*B62D 55/265* (2006.01)
*B62D 57/024* (2006.01)

(52) U.S. Cl.
CPC ......... *B62D 55/265* (2013.01); *B62D 57/024* (2013.01)

(58) Field of Classification Search
CPC .............................. B62D 55/265; B62D 57/024
See application file for complete search history.

(56) References Cited

U.S. PATENT DOCUMENTS

| | | |
|---|---|---|
| 7,765,032 B2 | 7/2010 | Huston et al. |
| 7,958,955 B2 | 6/2011 | Moser et al. |
| 8,604,900 B2 | 12/2013 | Kocijan |
| 9,233,724 B2 | 1/2016 | Kornstein et al. |
| 9,360,311 B2 | 6/2016 | Zanini |
| 9,540,061 B2 | 1/2017 | Albin et al. |
| 10,086,516 B2 | 10/2018 | Dubrovsky |
| 10,343,276 B2 * | 7/2019 | Carrasco Zanini .. B62D 57/024 |
| 10,518,800 B2 | 12/2019 | Dobell et al. |

(Continued)

FOREIGN PATENT DOCUMENTS

| | | |
|---|---|---|
| CN | 110065547 A | 7/2019 |
| CN | 209351490 U | 9/2019 |

(Continued)

OTHER PUBLICATIONS

Office Action in corresponding Saudi Arabian Application No. 123446860, mailed Apr. 15, 2024; 6 pages.

(Continued)

*Primary Examiner* — Kevin Hurley
(74) *Attorney, Agent, or Firm* — Leason Ellis LLP

(57) ABSTRACT

Systems and methods for dynamically magnetizing a chassis of a robotic vehicle are provided. The system can include a chassis having a fixed first section with a first magnet, and a moveable a second section having a second magnet with an opposition orientation relative to the first magnet. The second section is located above or below the first section and includes a mechanism that moves the second section relative to the first magnet. The system also includes an actuator connected to the second section, and a control system operatively connected to the actuator. In the systems and methods, the control system can send commands to the actuator to selectively move the mechanism, thereby moving the second section relative to the location of the first magnet to activate or inactivate a magnetic force on a portion of the chassis.

20 Claims, 19 Drawing Sheets

(56) References Cited

U.S. PATENT DOCUMENTS 10,829,171 B2 11/2020 Parrott
2021/0048327 A1 2/2021 Chen et al.

FOREIGN PATENT DOCUMENTS

CN 211809942 U 10/2020
CN 113787869 A 12/2021

OTHER PUBLICATIONS

Mahmoud Tavakoli et al; The hybrid OmniClimber robot: Wheel based climbing, arm based plane transition, and switchable magnet adhesion; http://www2.dem.uc.pt/pedro.neto/PUB/IJ/IJ_26.pdf; Mar. 26, 2016.
Manuel F. Silva et al; Climbing Robot for Ferromagnetic Surfaces with Dynamic Adjustment of the Adhesion System; https://www.hindawi.com/journals/jr/2012/906545/; Mar. 13, 2012.

\* cited by examiner

DYNAMICALLY MAGNETIZED CHASSIS FOR CRAWLING ROBOTIC VEHICLES

TECHNICAL FIELD

The present application generally relates to methods and systems for controlling the magnetism of a robotic vehicle, and more particularly, for magnetizing a chassis of a robotic vehicle to assess positioning control on a magnetic surface.

BACKGROUND OF THE DISCLOSURE

Robotic crawling vehicles (e.g. crawlers) can be designed to use different types of locomotion methods in an industrial setting—to climb a pipe, wall, or tank, for example—depending on the type of tasks the vehicle is designed to complete and the surfaces that it must traverse. For instance, there can be legged, tracked, wheeled, and limbless types of robotic crawling vehicles. In a legged type vehicle for traversing a wall, legs or arms push against the wall to support the body of the robot from falling. This methodology works best in environments where two or more planes (walls) are facing each other so the legs or arms can exert opposite forces to fix and stabilize the body of the robot.

Tracked locomotion-type vehicles move along a predetermined track, while wheeled locomotion-type vehicles move along one or more surfaces in a more conventional fashion using wheels. A tracked locomotion-type vehicle can generally provide more traction when compared to wheeled robots, however, it does not provide speeds as high as the wheeled locomotion method. Limbless-type locomotion vehicles are unique in that they use their own body for propulsion similar to how snakes move. As such, no additional robotic motion parts are needed for the vehicle to move.

The wheeled type robotic vehicle is most commonly used in industrial robotic systems due to its low energy demand and rapid speed compared to the other methods. Different type of wheels can be used and different adhesion methodologies can be used to keep the vehicle in contact with the surface, such as magnetism. Magnetic wheels are commonly used in industrial applications due to their capability of sticking on magnetically inductive surfaces, which make up the majority of industrial applications. One disadvantage of using magnetic wheels is that it can result in a scratching on the travelled surface.

Due to this disadvantage, some robotic systems have implemented a statically-magnetized chassis that provides similar adhesion to that of magnetic wheels. A statically-magnetized chassis, however, includes its own disadvantages for the motion of the robot, including its inability to overcome certain obstacles like weld beads on tanks, offsets between plate sections, gaps between plates, and more.

The present application addresses the above issues and other challenges related to locomotion by robotic systems, including robotic systems travelling on magnetic surfaces.

SUMMARY OF THE DISCLOSURE

In a first aspect, a system for dynamically magnetizing a chassis of a robotic vehicle is provided. The system includes a chassis having a first chassis section with at least one magnet, where the first chassis section is fixed in position, and a second chassis section having a magnet with an opposition orientation relative to the at least one magnet of the first chassis section. The second chassis section is located above or below the first chassis section and the second chassis section includes a mechanism that configures the second chassis section to selectively move relative to the location of the at least one magnet of the first chassis section. The system also includes an actuator operatively connected to the second chassis section. The system further includes a control system having a computing device that is operatively connected to the actuator. The control system is configured, via the computing device, to send commands to the actuator to selectively move the mechanism, thereby selectively moving the second chassis section relative to the location of the at least one magnet of the first chassis section to activate or inactivate a magnetic force on a portion of the first chassis section.

In another aspect, the control system further comprises at least one of: a proximity sensor under the chassis; an air pressure sensor; a wheel slip sensor; and at least one inertial measurement unit. In a further aspect, the computing device of the control system is configured to send commands to the actuator to selectively move the second chassis section based on at least external factor of the robotic vehicle. The at least one external factor is selected from the group consisting of: wheel slip as measured by the wheel slip sensor, changes in pressure exerted on wheels as measured by the proximity sensor or the air pressure sensor, and changes in tilt and orientation angles of the vehicle as measured by the at least one inertial measurement unit.

In another aspect, the actuator is a stepper motor or another mechanism that outputs a linear motion or translates any type of motion to a linear motion.

In another aspect, the first chassis section consists of one magnet.

In another aspect, the first chassis section consists of two magnets or three magnets.

In another aspect, the second chassis section is configured to move the magnet of the second chassis section horizontally, vertically, or both relative to the location of the at least one magnet of the first chassis section.

In another aspect, the magnets of the chassis are permanent magnets.

In another aspect, the first chassis section comprising at least two magnets and an insulation barrier between each of the at least two magnets.

In another aspect, wherein the mechanism is a rack and pinion mechanism.

In a second aspect, a method for dynamically adjusting a magnetized chassis of a robotic vehicle traveling on a magnetic surface is provided. In the method, the vehicle comprises a chassis having at least one magnet, an actuator operatively connected to the chassis, and a control system comprising a computing device having a processor and at least one sensor, where the processor is configured to send, receive, and analyze signals from the at least one sensor and the actuator. In the method, at least one external factor of the vehicle is measured with the at least one sensor. The measurement of the external factor is transmitted, with the at least one sensor, to the computing device. The measurement of the at least one external factor is analyzed with the computing device, and the computing device then determines based the analyzed measurement of the external factor, whether the chassis requires adjustment. The chassis is then adjusted with the actuator based on a signal from the computing device, such that the location or state of the at least one magnet of the chassis is changed, and adjustment of the chassis changes the magnetic force of at least a portion of the chassis towards the magnetic surface.

In another aspect, the at least one external factor is selected from the group consisting of: wheel slip, changes in pressure exerted on wheels, and changes in tilt and orientation angles of the vehicle.

In another aspect, the at least one sensor is selected from the group consisting of: a proximity sensor, an air pressure sensor, a wheel slip sensor, and at least one inertial measurement unit.

In another aspect, the chassis comprises a first section having a first magnet and a second section having a second magnet. The first magnet has an opposition orientation relative to the second magnet, and the step of adjusting the chassis includes moving the second section of the chassis relative to the first section of the chassis to activate or inactivate a magnetic force on a portion of the first section. In a further aspect, the first and second magnets are permanent magnets. In a further aspect, the second section moves via a rack and pinion mechanism. In a further aspect, the second section is configured to move horizontally, vertically, or both relative to the first section. In a further aspect, when the robot is traveling in a smooth motion state, the second magnet is centered in the middle of the chassis to allow equal attraction on both ends of the chassis.

In another aspect, the at least one magnet of the chassis is a permanent switchable magnet.

In another aspect, the actuator is a stepper motor or another mechanism that outputs a linear motion or translates any type of motion to a linear motion.

BRIEF DESCRIPTION OF THE DRAWING FIGURES

Figure 7:
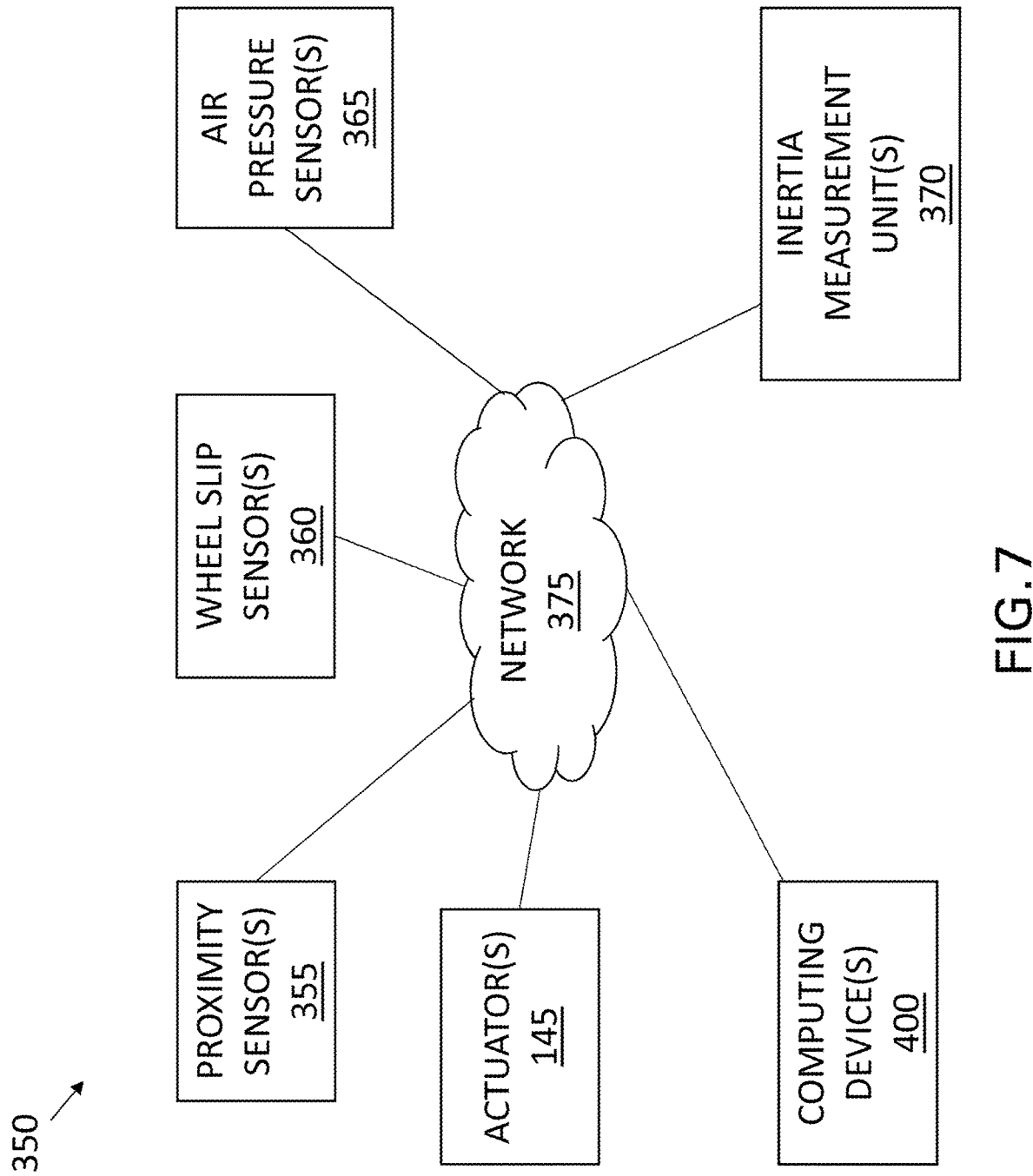
Figure 8:
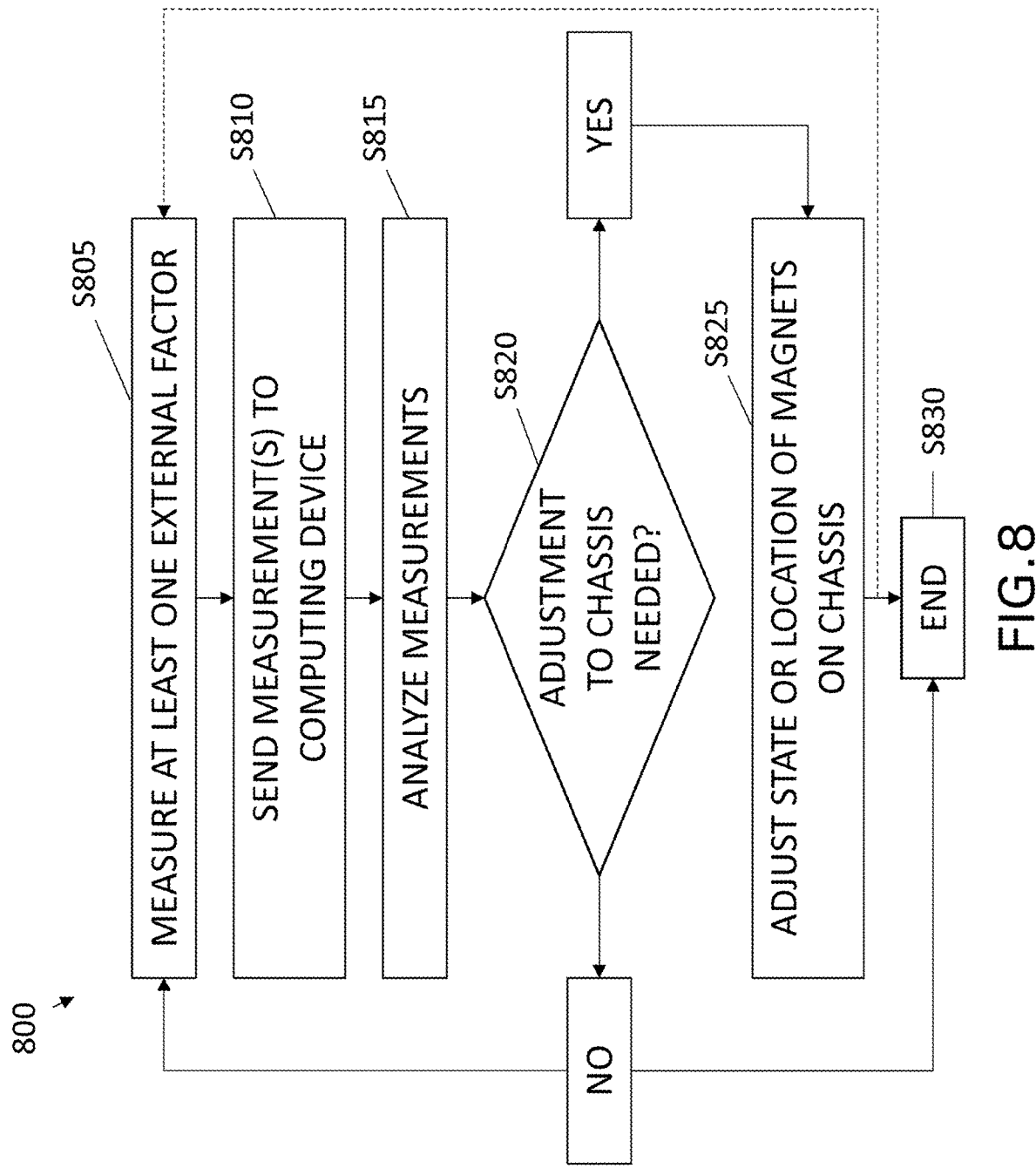
Figure 9:
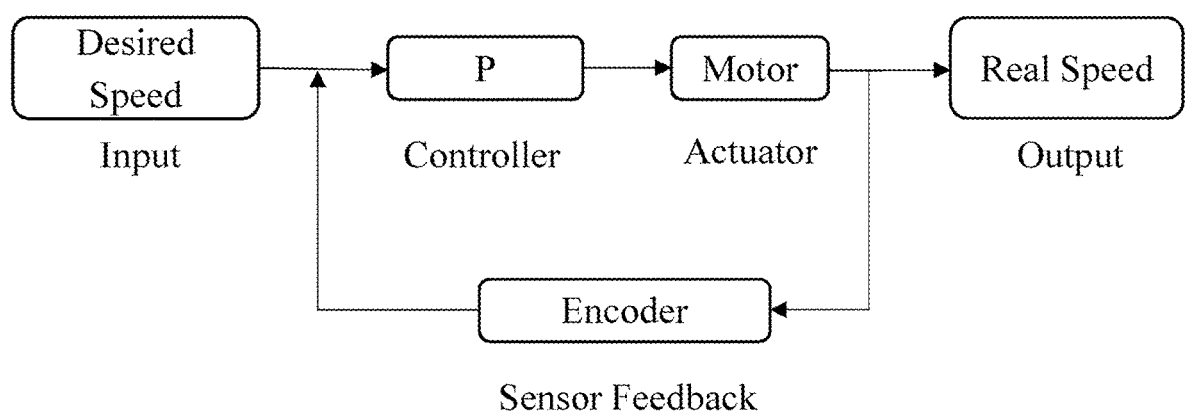
Figure 10:
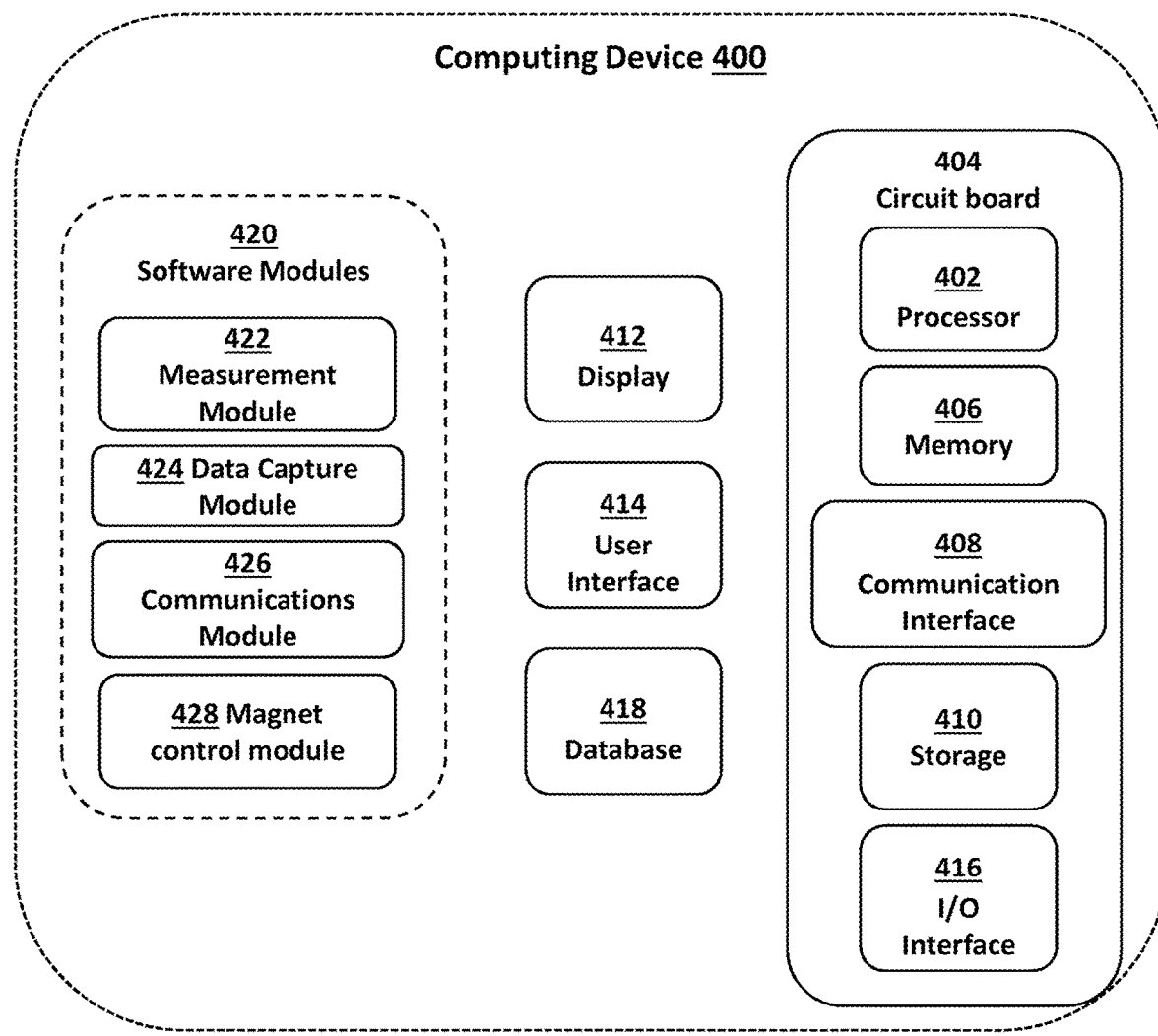

FIG. 7 displays a conceptual perspective view representation of an exemplary adaptive control system for dynamically magnetizing the chassis of a robotic vehicle in accordance with one or more embodiments;

FIG. 8 displays an exemplary flow diagram of a method for dynamically magnetizing a chassis of a robotic wheeled vehicle traveling along a magnetic surface in accordance with one or more embodiments;

FIG. 9 displays a block diagram of a closed-loop speed feedback control mechanism of the adaptive control system in accordance with one or more embodiments; and FIG. 10 displays a block diagram illustrating an exemplary configuration of hardware and software components of one or more computing devices of the adaptive control system in accordance with one or more embodiments.

DETAILED DESCRIPTION OF CERTAIN EMBODIMENTS

The present application describes systems and methods for dynamically magnetizing a chassis of a robotic vehicle (e.g., robotic wheeled vehicle), which thereby controls the adhesion of the vehicle to a magnetically inductive surface. In one or more embodiments, the present systems and methods include a robotic vehicle having a chassis that includes one or more magnets. The present systems and methods control the positioning or state (e.g., on and off) of the magnets on the chassis of the vehicle using an adaptive control mechanism (adaptive control system). The adaptive control mechanism utilizes measurements of external factors of the vehicle such as speed, tilt angle, pressure exerted on wheels by surface, or the inertial measurement unit (IMU) to dynamically adjust the magnetism of the chassis. Adaptively controlling the magnetism of the chassis allows the present system to maximize attraction of the vehicle to the surface as the vehicle travels along it and allows the vehicle to more successfully traverse different obstacles on the surface, including transitioning between various surface geometries. More specifically, based on the determinations of the adaptive control mechanism (e.g. detection of obstacles or wheel slip), the present system aligns the magnets of the chassis in various ways to facilitate a stronger adhesion of the robotic vehicle to the surface at either the front or back end of the chassis. Additionally, when the robotic vehicle is in a smooth motion state (e.g., level surface, no obstacles), the present systems aligns the magnets of the chassis to allow equal attraction on both ends of the robotic chassis. Unlike robotic vehicles with magnetic wheels travelling on magnetic surfaces, the present system does not result in scratches to the travelling surface or to the wheels, as the magnetic attraction of the vehicle to the surface stems from the chassis. Thus, the wheels of the present robotic vehicle are not magnetic.

With the use of the adaptive control system (mechanism) and different mechanical motion mechanisms of the chassis, the present system allow the magnets of the chassis to change location or state such that the magnetism of the chassis is dynamically changing as the vehicle moves along the surface. This dynamic magnetization increases attraction of the robotic crawler with the magnetic surface and assists the vehicle in overcoming obstacles such as gaps, offsets, or weld beams.

These and other aspects of the present systems and methods are described in further detail below with reference to the drawing figures.

Figure 1:
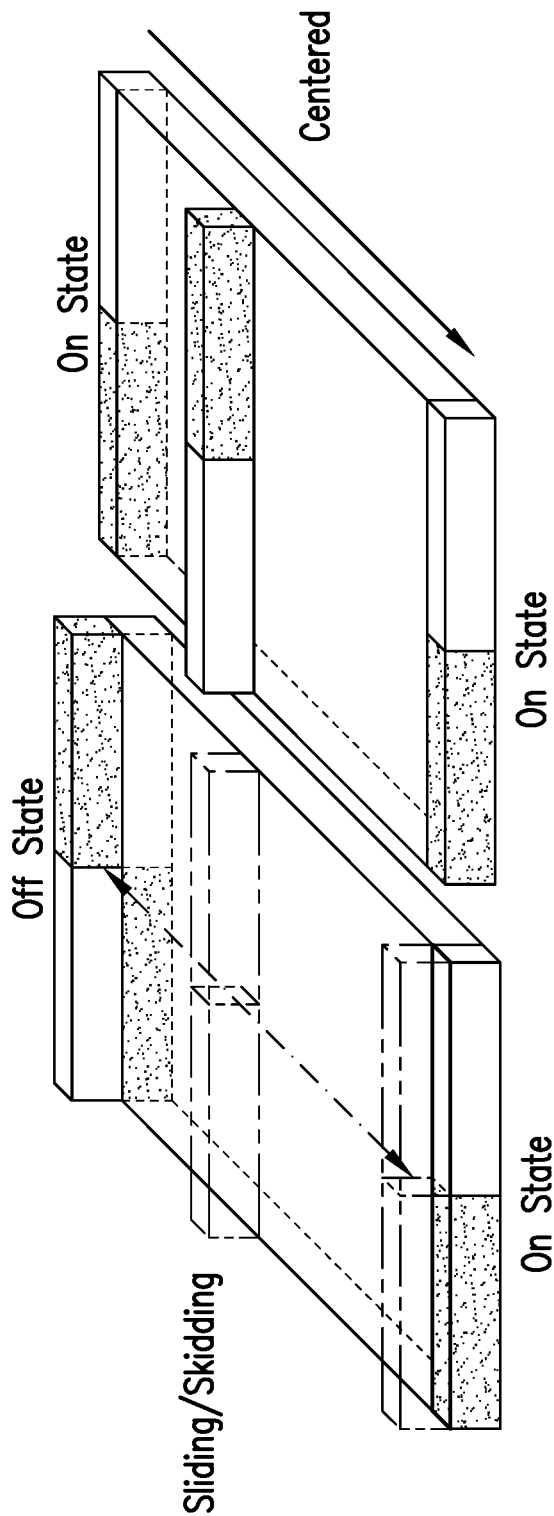
FIG. 1 shows a generic sliding/skidding mechanism for opposite-oriented permanent magnets in accordance with one or more embodiments.

In accordance with one or more embodiments, the present systems and methods for dynamically magnetizing a chassis of a robotic, wheeled vehicle ("vehicle") utilize a sliding/skidding mechanism to switch the location and state ("on" or "off") of permanent magnets. A generic sliding/skidding mechanism is shown in FIG. 1. Specifically, FIG. 1 displays a mechanism in which a top permanent magnet is positioned on top of two bottom magnets and configured to move between the two of them. The top permanent magnet is opposite in polarity (opposite-oriented) relative to the bottom permanent magnets. When the top magnet is position directly on top of one of the bottom magnets, that bottom magnet becomes inactivated. Conversely if the top magnet is positioned away from a bottom magnet, that magnet remains activated. When the top magnet is positioned between the two bottom magnets (i.e., not on top of either magnet), both bottom magnets remain activated.

Accordingly, in one or more embodiments of the present application, the chassis of the robotic, wheeled vehicle can be a chassis having at least one top magnet and at least one bottom magnet, such that the top and bottom magnets have opposite orientations. The top magnet can be configured to selective move on top of and away from the at least one bottom magnet, and thereby selectively inactivate the magnetic force of the bottom magnet. Thus, when the vehicle is traversing a magnetic surface, the positioning of the top and bottom magnets of the chassis can be selectively changed to alter the magnetic force of all or part of the chassis toward the surface. This feature allows the vehicle to more adeptly traverse obstacles and imperfections on the travelling magnetic surface as discuss in further detail below.

Figure 2A:
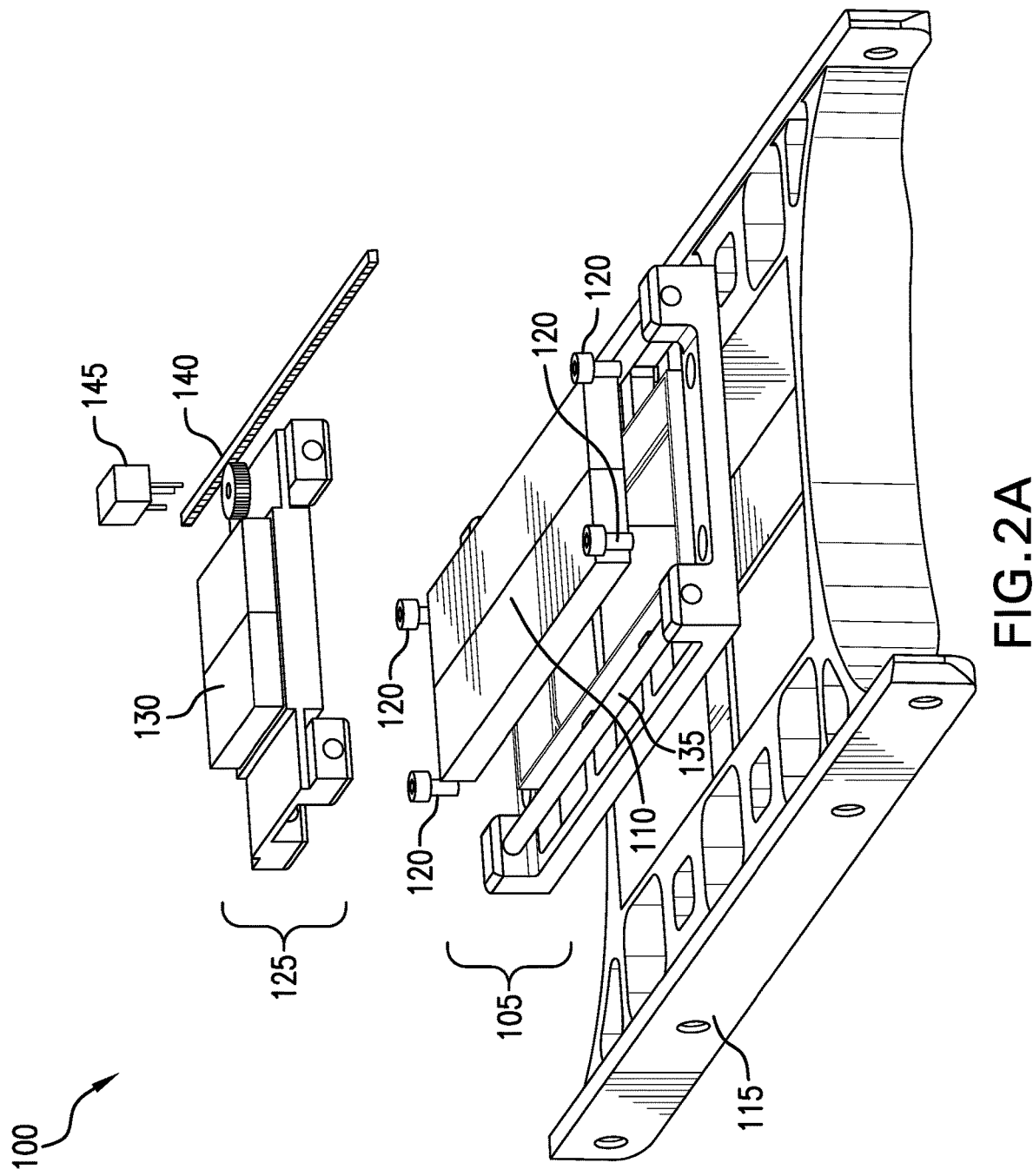
FIGS. 2A-2E show diagrams of exemplary chassis of a robotic wheeled vehicle, which can include a top magnet and at least one bottom magnet in accordance with one or more embodiments.

FIGS. 2A-2E display an exemplary chassis of robotic wheeled vehicle, including a top magnet and at least one bottom magnet, in accordance with one or more embodiments. With reference now to FIG. 2A, an exploded view of an exemplary chassis 100 is shown. The chassis can be made of any material that is considered non-ferromagnetic (does not conduct magnetism or conducts magnetism very slightly), such as plastic or aluminum, for example. The chassis 100 include a bottom chassis section 105 which include at least one permanent magnet 110. The bottom chassis section 105 is fixed to the chassis framework 115, which connects the chassis 100 to the robotic vehicle. The at least one permanent magnet 110 is held in a fixed position within the bottom chassis section 105. For example, as exemplified in FIG. 2A, the at least one permanent magnet 110 can be held within the bottom chassis section 105 by pins or screws 120. Other mechanisms (e.g., adhesive) for fixing the at least one permanent magnet 110 in the bottom chassis section 105 as an alternative to or in addition to pins or screws 120 can be also be used as would be understood in the art. As exemplified in FIG. 2A, in one or more embodiments, the at least one magnet 110 of the bottom chassis section 105 can be a single magnet block that extends the length or substantially the length of the bottom chassis section 105. In one or more embodiments, the at least one magnet 110 of the bottom chassis section 105 can be two or three separate magnets positioned separately along the length of the bottom chassis section 105.

The chassis 100 also includes a top chassis section 125 that is positioned above the bottom chassis section 105 and is attached to the bottom chassis section 105. The top chassis section 125 includes at least one permanent magnet 130 that is opposite in polarity (opposite-oriented) relative to the at least one permanent magnet 110 of the bottom chassis section 105. For instance, in one or more embodiments as exemplified in FIG. 2B, the top magnet 130 and the bottom magnet 110 can be oriented through width such that the two sides of the top magnet 130 are of opposite polarity relative to the magnet 110 of the bottom chassis section 104. The permanent magnet 130 is fixed to top chassis section 125 via pins, screws, adhesive other mechanism as would be understood in the art.

In one or more embodiments, the top chassis section 125 is attached to the bottom chassis section 105 via a pair of bars 135 located on opposite sides of and along the length of the bottom chassis 105, which allow the top chassis section 125 to slide along the length of the bottom chassis section 105. In at least one embodiment, a portion of the top chassis section 125 can also be attached to the chassis framework 115. In one or more alternative embodiments, the magnets 110 and 130 are switchable magnets.

The top chassis section 125 includes a mechanism 140 that configures the top chassis section 125 to selectively move relative to the location of the at least one magnet 110 of the bottom chassis section 105. This mechanism could be any mechanically or electrically-controlled linear motion mechanism. In one or more embodiments, this mechanism is a rack and pinion mechanism 140, as exemplified in FIGS. 2A-2E. The rack and pinion mechanism 140 allows the top chassis section 125 to selectively move the top chassis section 125 and the permanent magnet 130 relative to the location of the at least one magnet 110 of the bottom chassis section 105. Specifically, the rack and pinon mechanism 140 allows the top chassis section 125 and the opposite-oriented top magnet 130 to move along the axis of the bottom chassis section 105 (front to back and vice versa). In one or more embodiments, the motion of the top chassis section 125 is controlled by actuator 145. In the example of FIGS. 2A-2E, the rack is fixed on the top chassis section 125 and the pinion is stationary on the shaft of the actuator 145. Specifically, as shown in FIGS. 2A-2E, the rack and pinion mechanism 140 translates the rotational motion provided by the actuator 145 to a linear motion. In one or more embodiments, the actuator 145 is a motor, such as a stepper motor.

Figure 2B:
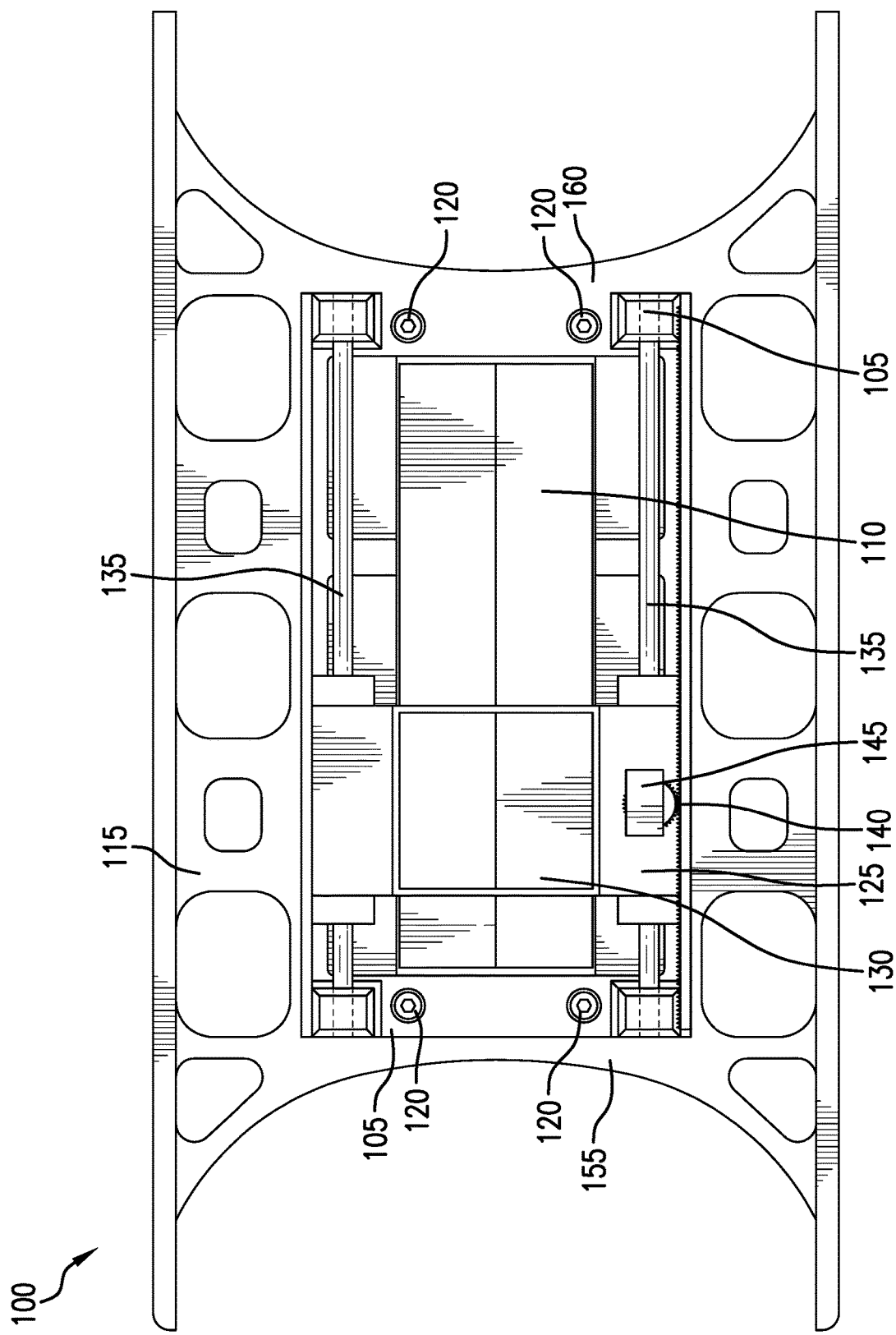
Figure 2C:
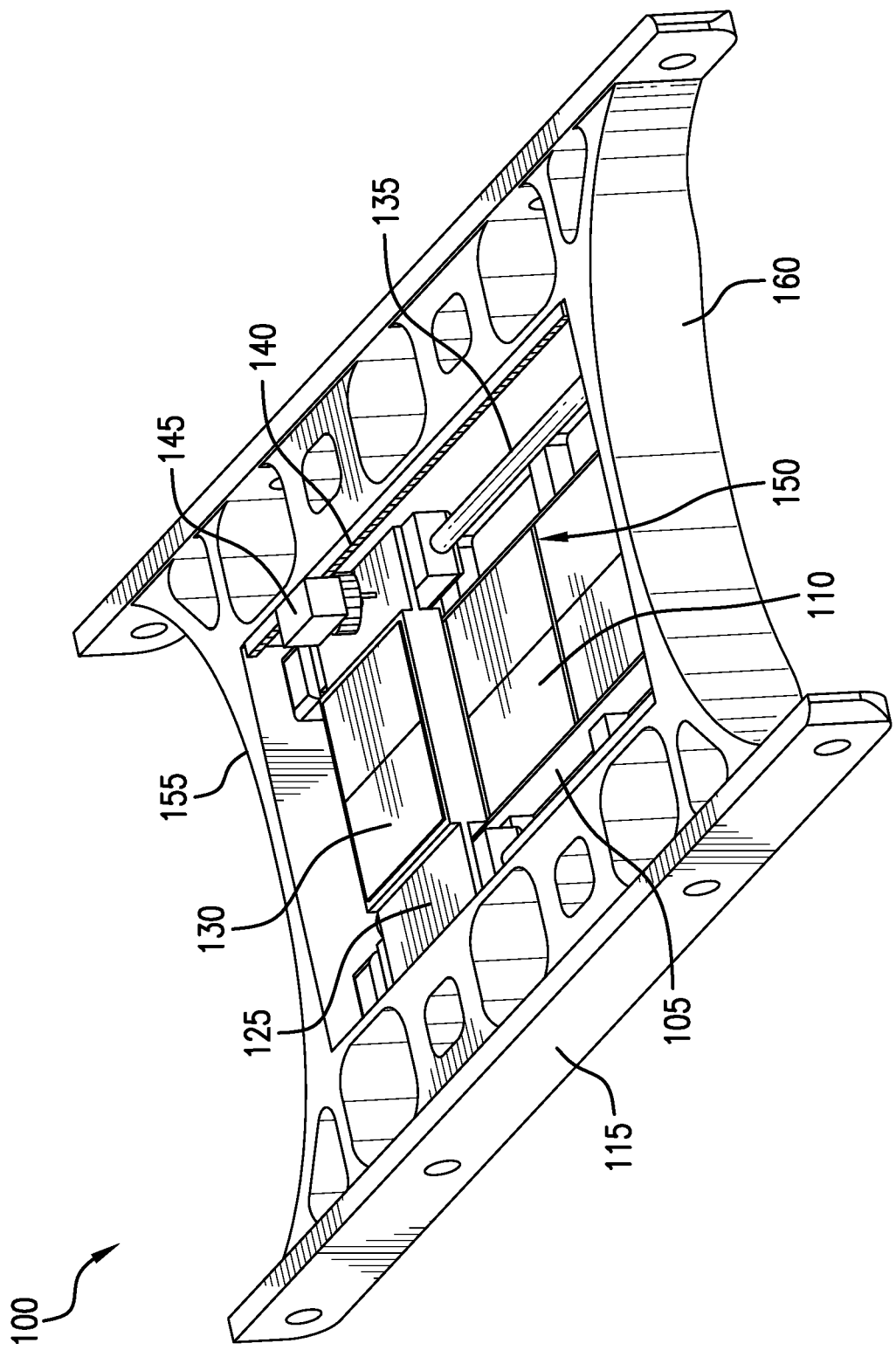
Figure 2D:
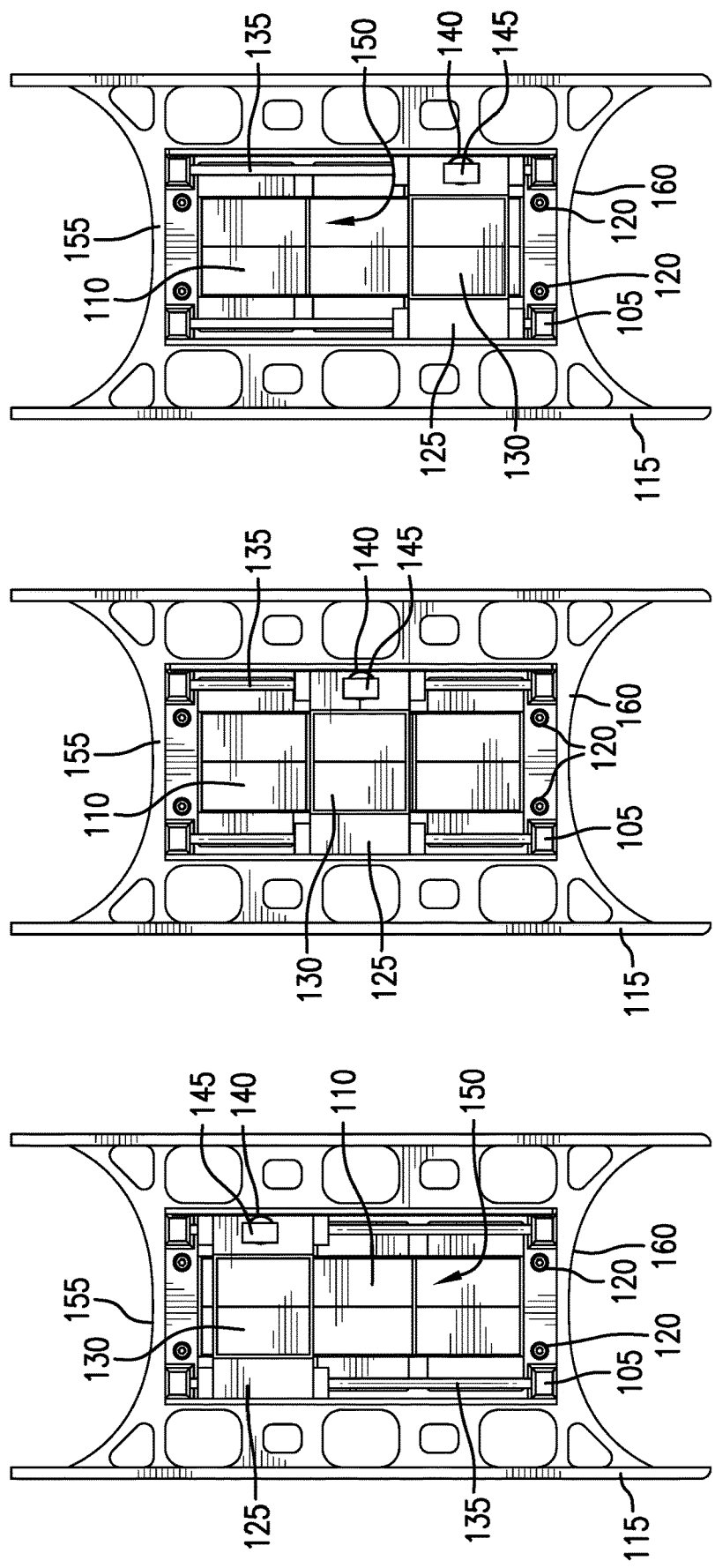
Figure 2E:
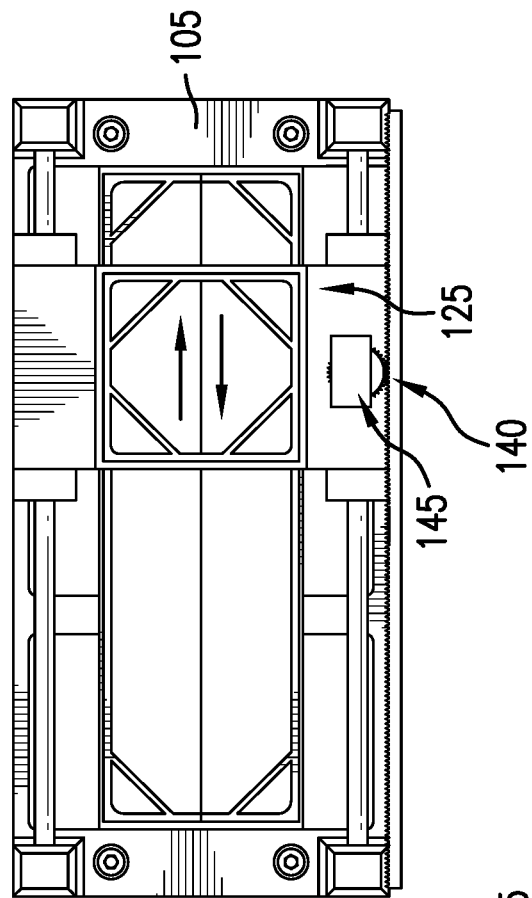
Figure 2E:
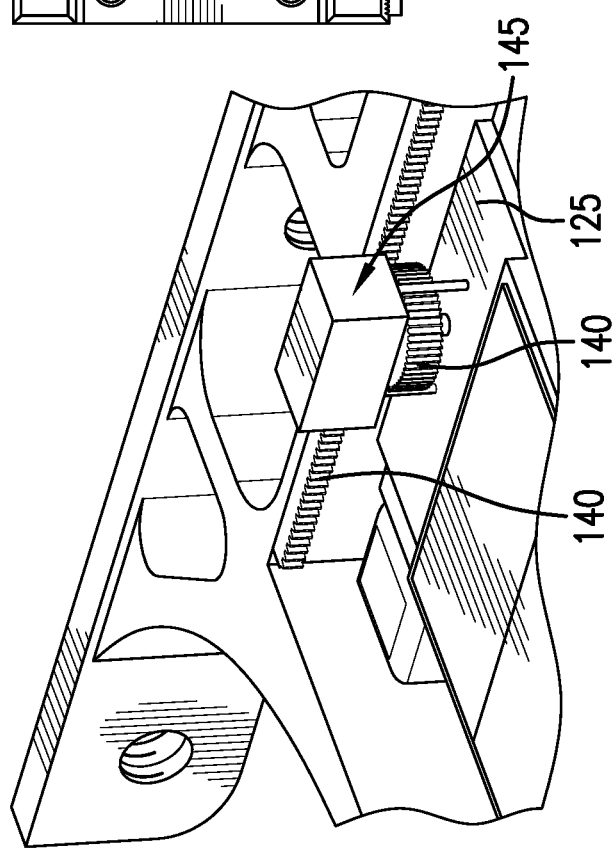

As shown in FIGS. 2B-2D, the top magnet 130, which is opposite in polarity to the magnet(s) 110 fixed on the bottom chassis section 105, can be selectively moved along the length of the bottom chassis section 105 to cancel the effect of magnetism on a portion of the bottom magnet(s) 110. In other words, positioning of the top magnet 130 on top of a portion of the bottom magnet(s) 110 selectively turns off the state of the bottom magnet(s) 110 on either side of the chassis, which causes the magnetic force to be inactive on a portion of the chassis 100 and active on the remaining portion of the chassis 100.

For example, FIG. 2D shows an exemplary embodiment of the chassis 100 in which the top chassis section 125 includes one magnet 130 and the bottom chassis section 105 includes three magnets 110. As shown in FIG. 2D, when the top magnet 130 is located at the proximal end 155 of the axis of the bottom chassis section 105 (left panel of FIG. 2D), the magnetic force on the proximal end 155 of the chassis is canceled, while the magnetic force on the remaining portion of the chassis 100 remains active. In other words, the top magnet 130 cancels the magnetic force of the magnet on the proximal end 155 of the bottom chassis section 105. Likewise, when the top magnet 130 is positioned at the distal end 160 of the axis of the bottom chassis section 105 (right panel of FIG. 2D), the magnetic force of the bottom magnet on the distal end 160 of the chassis is canceled, and the magnetic force on the remaining portion of the chassis 100 remains active. When the top magnet 130 is located between the proximal end 155 and distal end 160 of the axis of the bottom chassis section 105 (center panel of FIG. 2D), the magnetic force on both the proximal end 155 and the distal end 160 of the chassis remains active, while the magnetic force in the center of the chassis (i.e., the center magnet on the bottom chassis section 105) is canceled. The selective movement of the top magnet 130 facilitates a stronger magnetic force on the proximal or distal end 160 of the chassis to the magnetic surface upon which the vehicle is travelling, which aids the vehicle as it traverses obstacles on the magnetic surface (e.g., weld joints or seams, changing surface geometries, gaps). Conversely, when the vehicle is in a smooth motion state (e.g., level magnetic travelling surface with no obstacles), the sliding top magnet 130 can be positioned between the proximal end 155 and the distal end 160 of the chassis to allow equal or substantially equal magnetic attraction on both ends of the robotic chassis 105. Thus, in this embodiment in which the bottom chassis section 105 includes three magnets, the system provides separate front, middle or back magnetism on the chassis, which is beneficial in traversing weld beams, unaligned surfaces or gaps because the forces needed to consistently traverse such uneven surfaces necessitates that the chassis to be closer to the surface at one end than the other.

Conversely, embodiments with one large magnet on the bottom chassis section (see FIG. 2A) can be used to weaken a partial section of the adhesion force to the metallic surface, which can be helpful during overcoming surface obstacles during vertical climbing. On the other hand, having two or three magnets on the bottom chassis section that are equivalent in size to the top magnet will provide complete magnetic cancellation to that segment of the chassis, which can be helpful during horizontal maneuvering and overcoming ground obstacle like metallic steps or horizontal weld beams located on the ground with reference to the chassis.

As shown in FIGS. 2C-2D, in embodiments in which the bottom chassis section 105 comprises more than one magnet 110, the magnets 110 can be separated by an insulation barrier 150, which allows the top magnet 130 to smoothly transition between cancelling each bottom magnet, thus providing an effective partial magnetic force cancellation. The insulation barrier 150 can be made of any material that is not magnetically conductive, such as plastic, for example.

The top chassis section 125 and its magnet 130 can be selectively moved based on commands derived from an adaptive control system, as explained in further detail below with reference to FIGS. 7-10. For instance, in one or more embodiments, the adaptive control system includes a computing device (e.g., microcontroller) having a processor that is configured to send commands to the actuator 145 to selectively move the rack and pinion mechanism 140. This causes the top chassis section 125 to selectively move relative to the location of the at least one magnet 110 of the bottom chassis section 105, thereby activating or inactivating the magnetic force on a portion of the bottom chassis. In embodiments that include the computing device and adaptive control system, the control system and the actuator actively control the state and location of magnets of the chassis.

In at least one embodiment, the state of the magnets of the bottom chassis section can be passively controlled. For example, the passively controlled mechanism can be a mechanically self-adjusting mechanism (e.g., utilizing springs or a pendulum for actuation without the use of a computing device). In one such implementation, the top chassis section can be independently controlled by the gravitational forces of the earth such that the top chassis section adjusts its location on its own by the effect of gravity while the robotic vehicle is traversing the surface. Alternatively, the top chassis section can change its location based on the magnetic force between the magnets of the top chassis section and the traversed surface, and thus the control mechanism relies solely on the magnetic force without any input from a computing device. This implementation relies on the proximity of the top magnets to the traversed surface.

Figure 2F:
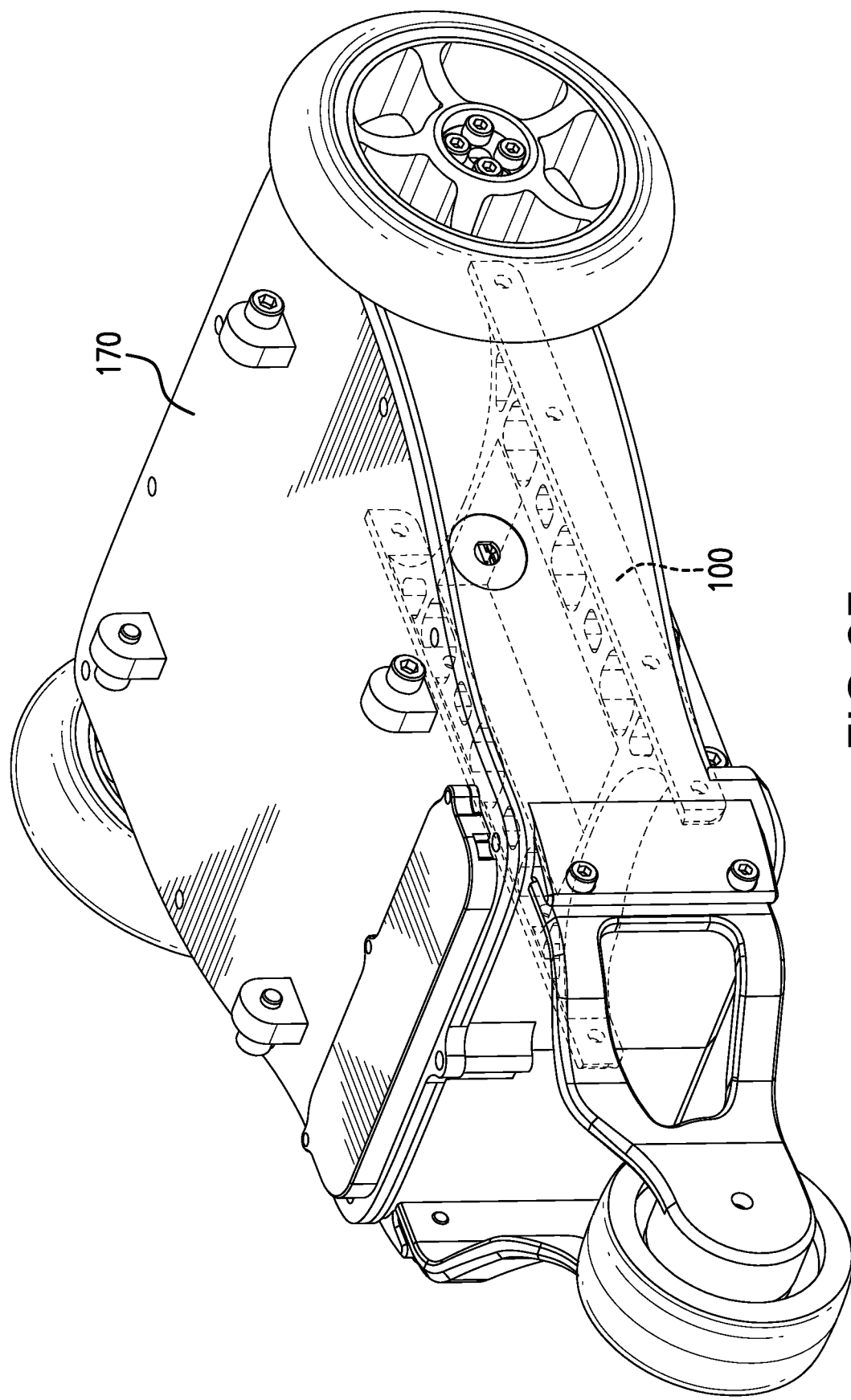
FIGS. 2F-2G show a side perspective view and a side view, respectively, of an exemplary wheeled robotic vehicle comprising the chassis in accordance with one or more embodiments.
Figure 2G:
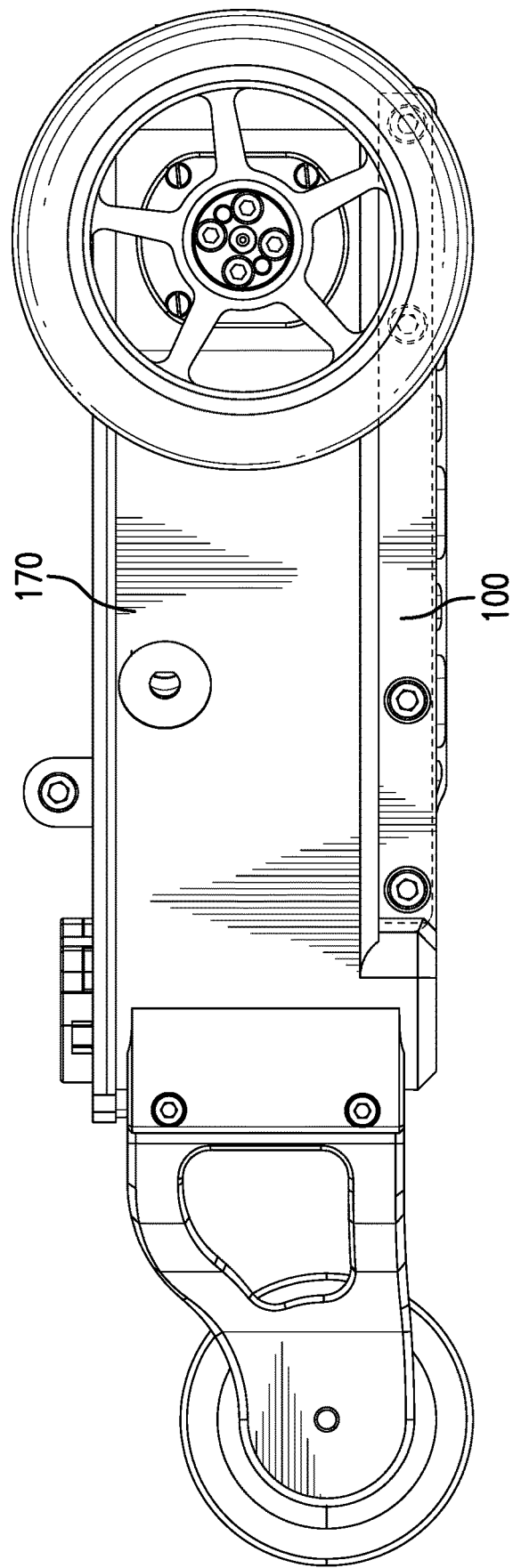

FIGS. 2F and 2G show a side perspective view and a side view, respectively, of an exemplary wheeled robotic vehicle 170 comprising the chassis 100 in accordance with one or more embodiments. It should be understood that the robotic vehicle 170 of FIGS. 2F-2G is an exemplary vehicle, and that other robotic vehicles, including other wheeled robotic vehicles can be utilized with the chassis of the present application in accordance with one or more embodiments. It should also be understood any of the chassis disclosed in the present application can be integrated into the robotic vehicle 170 in accordance with one or more embodiments.

Figure 3A:
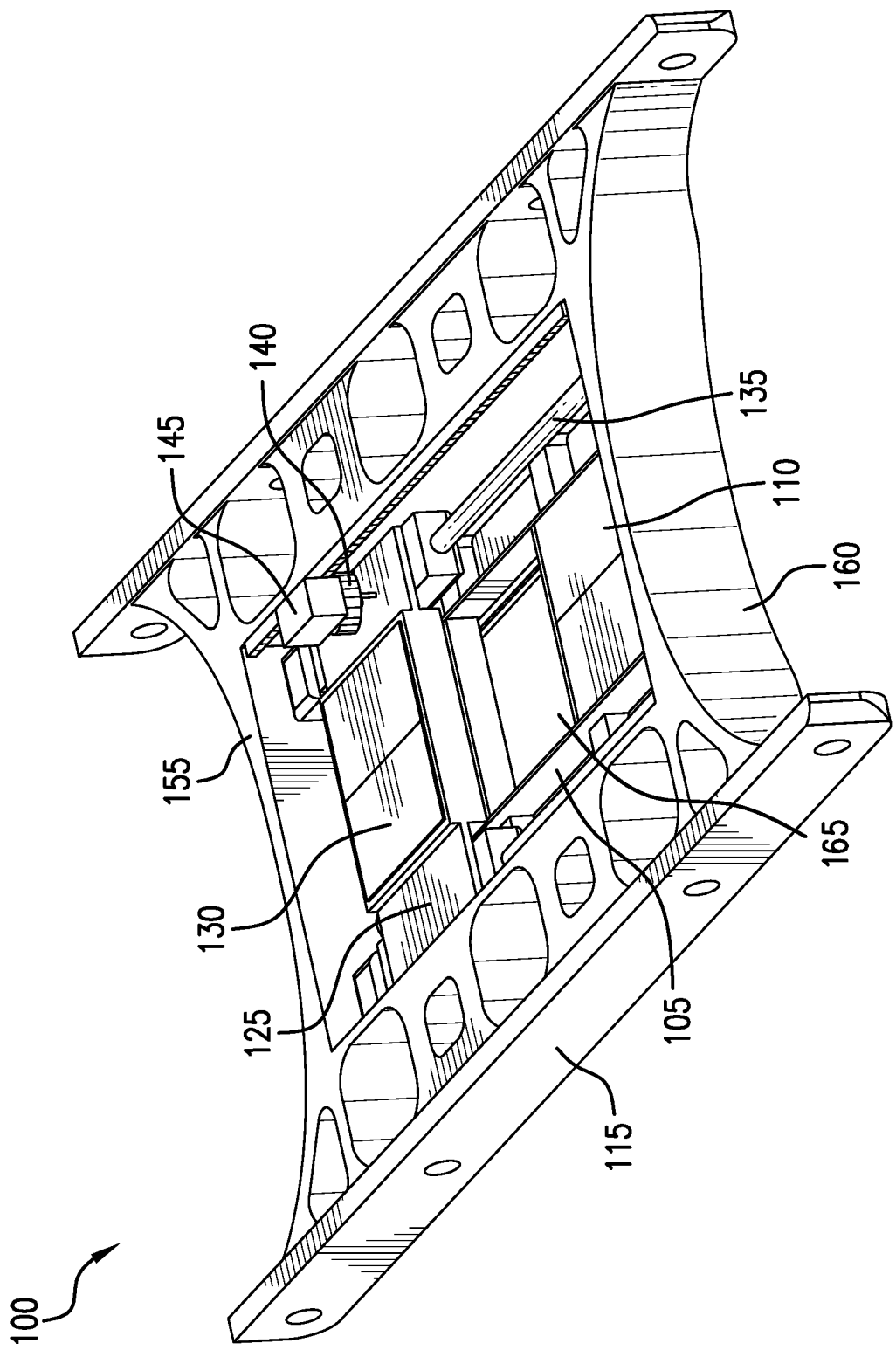
FIGS. 3A-3B show diagrams of an exemplary chassis of a robotic wheeled vehicle, including a top magnet and two bottom magnets in accordance with one or more embodiments.
Figure 3B:
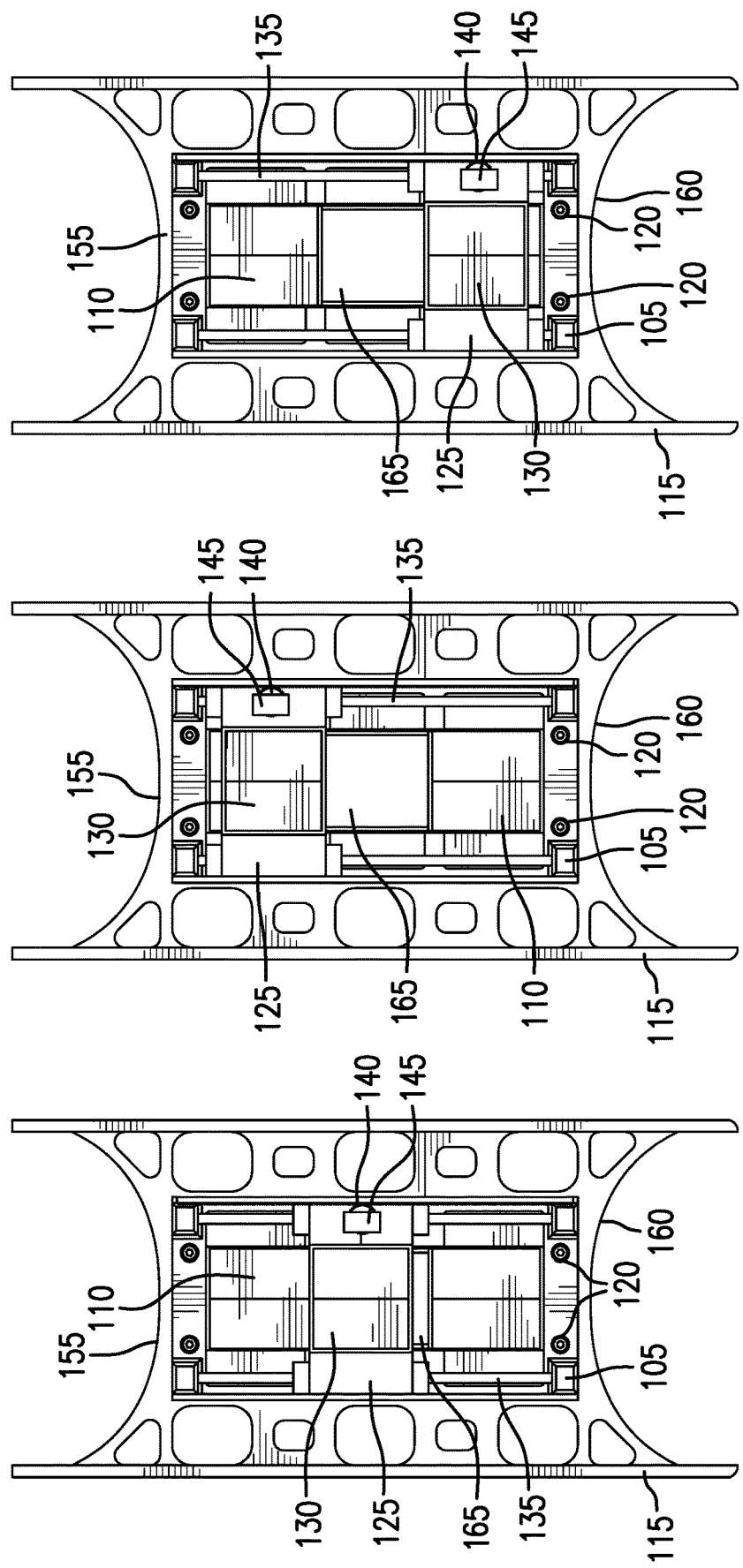

FIGS. 3A-3B shows another exemplary embodiment in which the bottom chassis section 105 includes two bottom magnets 110, one of the magnets being located on the proximal end 155 of the bottom chassis section 105 and the other being located on the distal end 160 of the bottom chassis section, with a space 165 in between. In this embodiment, the top chassis section 125 include one magnet 130. As shown in FIG. 3B, the when the top magnet 130 is located at the proximal end 155 of the bottom chassis section 105, the magnetic force on the proximal end 155 of the chassis is canceled and the magnetic force on the distal end 160 remains active. Likewise, when the top magnet 130 is located at the distal end 160 of the bottom chassis section 105, the magnetic force on the distal end 160 of the chassis is canceled and the magnetic force on the proximal end 155 of the chassis remains active. When the top magnet 130 is located above the space 165 between the two bottom magnets 110, the magnetic force on both the proximal end 155 and the distal end 160 of the chassis remains active. Thus, in this embodiment, the space 165 between the bottom magnets 110 functions in a similar fashion as the insulation barrier, in that the space 165 allows the top magnet 130 to smoothly transition between cancelling the proximal end 155 bottom magnet and cancelling the distal end 160 bottom magnet.

In one or more embodiments, the top chassis section 125 is configured to move the magnet(s) 130 horizontally, vertically, or both relative to the location of the at least one magnet 110 of the bottom chassis section 105. For example, the rack and pinion mechanism 145 can be nested in a second rack and pinion mechanism so that motion in both the x and y axes (in the same plane) is allowed. As such, a second actuator operatively connected to the second rack and pinion mechanism can be used to facilitate dual directional motion for the top magnet(s).

Figure 3C:
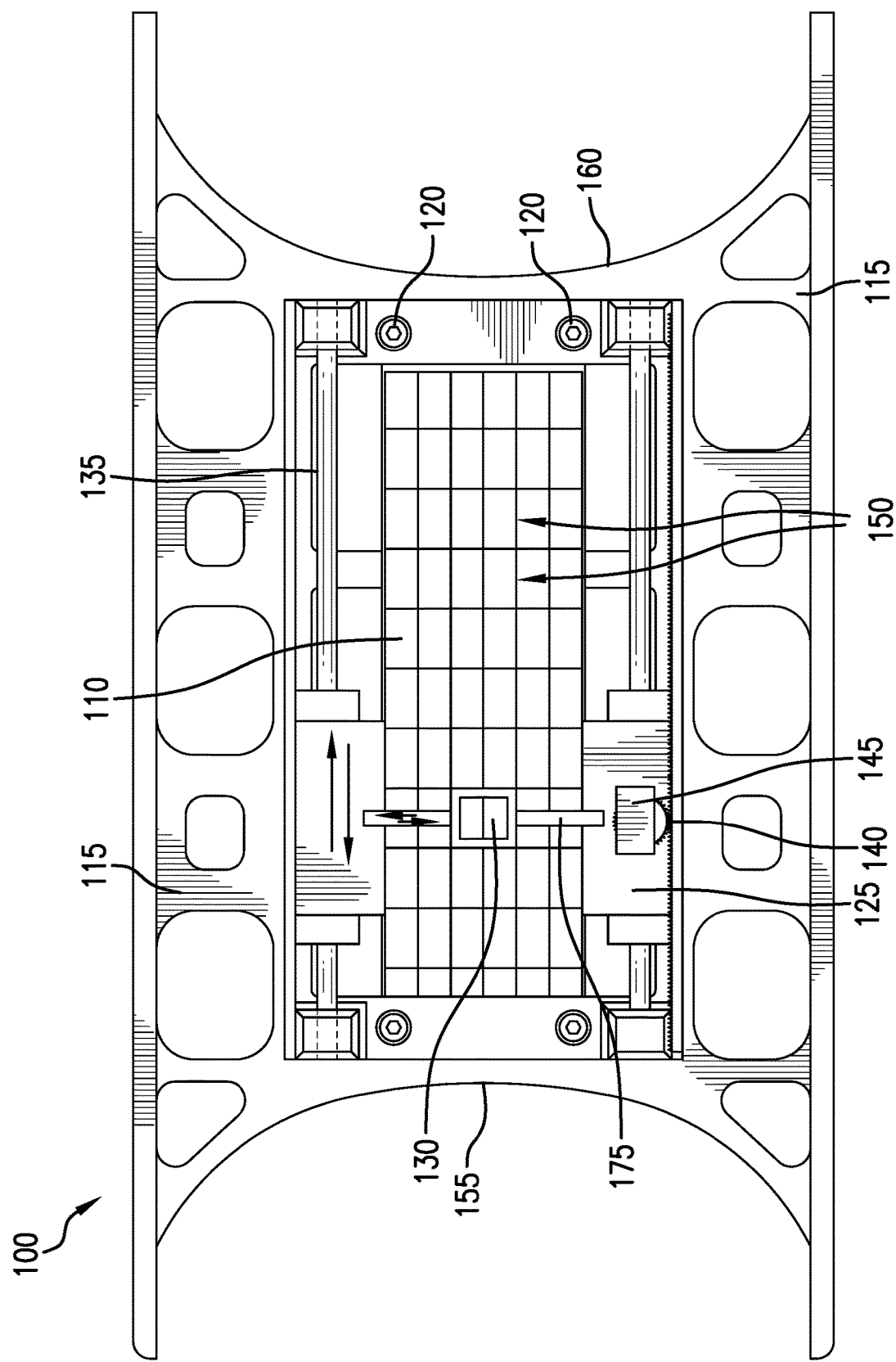
FIG. 3C shows a diagram of an exemplary chassis of a robotic wheeled vehicle in which the top chassis section moves a top magnet horizontally and vertically relative to the location of the magnets of the bottom chassis section in accordance with one or more embodiments.

For example, FIG. 3C displays an exemplary embodiment of the chassis in which the top chassis section is configured to move the top magnet horizontally and vertically relative to the location of the magnets of the bottom chassis section 105. In this embodiment, the top chassis section 125 is configured to move the top magnet horizontally via the rack and pinon mechanism 140 and vertically via a second mechanism 175. This second mechanism 175 can be another rack and pinion mechanism, for example, and the second mechanism 175 can be controlled by the actuator 145 or a separate actuator. In this embodiment, the mechanisms 140 and 175 work in tandem to allow the top magnet 130 to move in horizontal and vertical directions relative to the locations of the bottom magnets 110, which can allow for more targeted cancellation of the magnetic force of variation portions of the bottom chassis section 105. In at least one embodiment, the top chassis section 125 can be configured to move the magnet(s) 130 along a specific profile (direction) other than a horizontal or vertical direction. This movement of the magnet(s) 130 along the specific profile can be in addition to or instead of movement of the magnet(s) 130 in a horizontal or vertical direction.

In one or more embodiments, the rack and pinion mechanism can be substituted with another mechanism for moving the top chassis section or a magnet of the top chassis section. For instance, in at least one embodiment, other sliding and skidding mechanical mechanisms can be used to facilitate motion of magnets (in both horizontal and vertical lateral directions) inside the chassis such as a lead screw linear motion system, timing belts and/or a variable angle transmission mechanism for circular/elliptical profiles. The lead screw linear motion system can comprise a threaded rod, which is rotated by a stepper motor, and a mating nut that moves up and down the threaded rod as it rotates. The timing belt drive system can comprise a timing belt with teeth, a toothed pulley which is attached to a motor, and a carriage attached to the belt. The motion of the motor gets translated to the pulley system which interfaces with the timing belt that holds the carriage where the magnet would be placed. The variable angle transmission mechanism consists of a set of gears and rods with a free rotational axis coupling that, when combined together, a variable angle motion is facilitated. Other mechanisms that can be used for moving the top chassis section or a magnet of the top chassis section include, but are not limited to, a conveyor belt, a two linkage bar mechanism, and a slider-crank mechanism.

The example mechanism of FIGS. 2A-2E and 3A-3B is for moving the magnet in one dimension. However, it should be understood that, in certain embodiments, this type of mechanism or the alternative mechanisms listed above can be utilized to move the magnet in two dimensions. Additionally, FIGS. 2A-2E and 3A-3C display exemplary embodiments in which the top chassis section is moveable, and the bottom chassis section is fixed. However, it should be understood that, in other embodiments, the roles of the top and bottom chassis sections can be reversed, such that the bottom chassis section includes one or more mechanisms (e.g., rack and pinion mechanism) for moving the bottom chassis section and its magnet(s) in one or more directions (e.g., horizontally, vertically) relative to the location of the magnets of the top chassis section, and the top chassis section remains fixed in place.

Figure 4A:
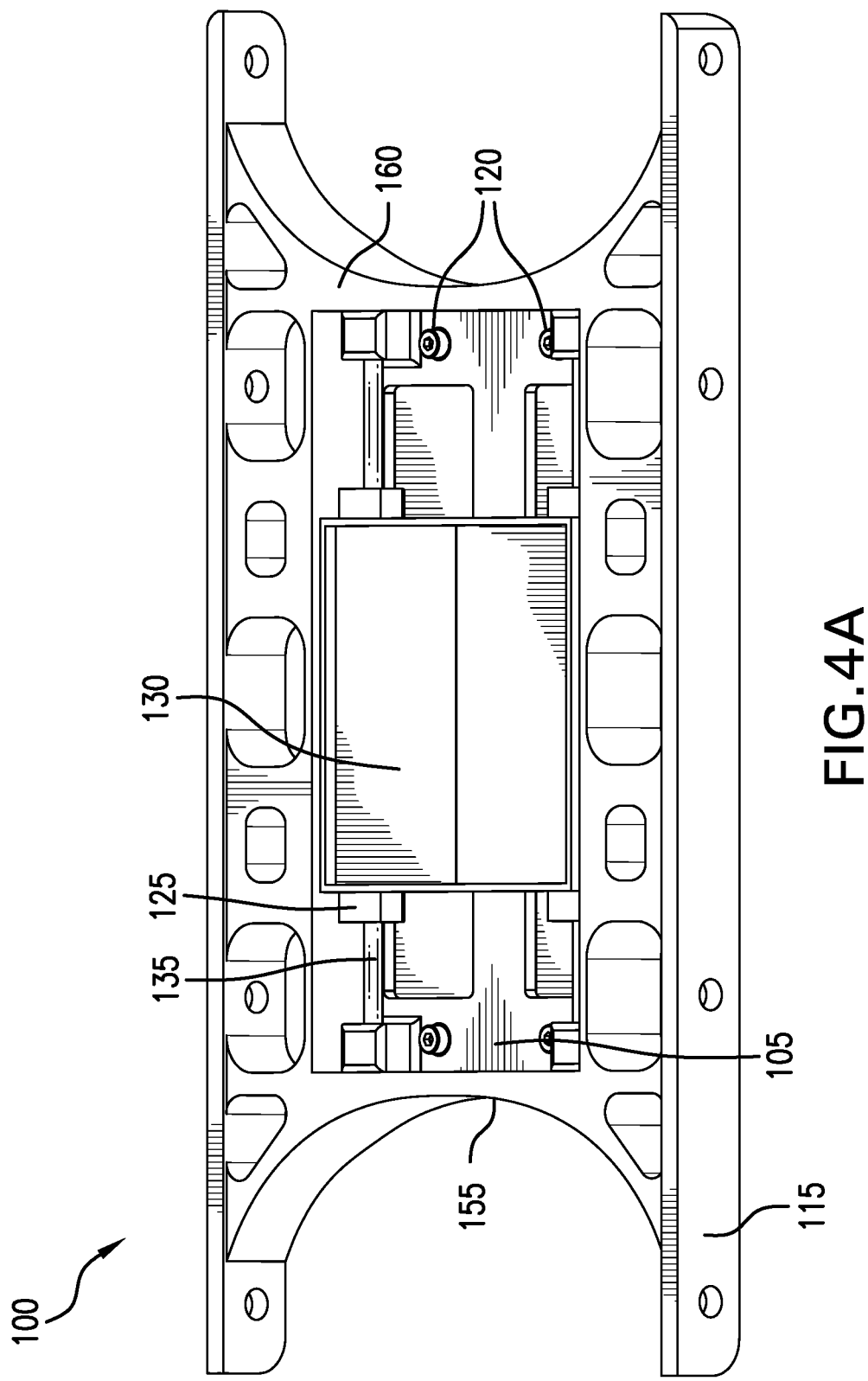
FIGS. 4A-4B show diagrams of an exemplary chassis of a robotic wheeled vehicle, including a moveable top chassis section that can accommodate one or more magnets in accordance with one or more embodiments.

In at least one embodiment, the chassis includes one or more permanent magnets on only the top chassis section. As such, the magnet(s) of the top chassis section provide the magnetic force towards the magnetic surface that the vehicle traverses and the changing of the location of the one or more permanent magnets on the top chassis section changes the location of the magnetic force on the vehicle. As show in FIGS. 4A-4B, this embodiment of the chassis has substantially the same features as the embodiments of FIGS. 2-3, except without any magnets on the bottom chassis section. In at least one implementation, the location of magnet(s) of the top chassis section can be changed horizontally, vertically, or along a specific profile using a sliding or skidding mechanical mechanism that is either actively or passively operated. The actively operated version can include a microcontroller (brain) that is part of an adaptive control system and actuator 145 (e.g. stepper motor).

Figure 4B:
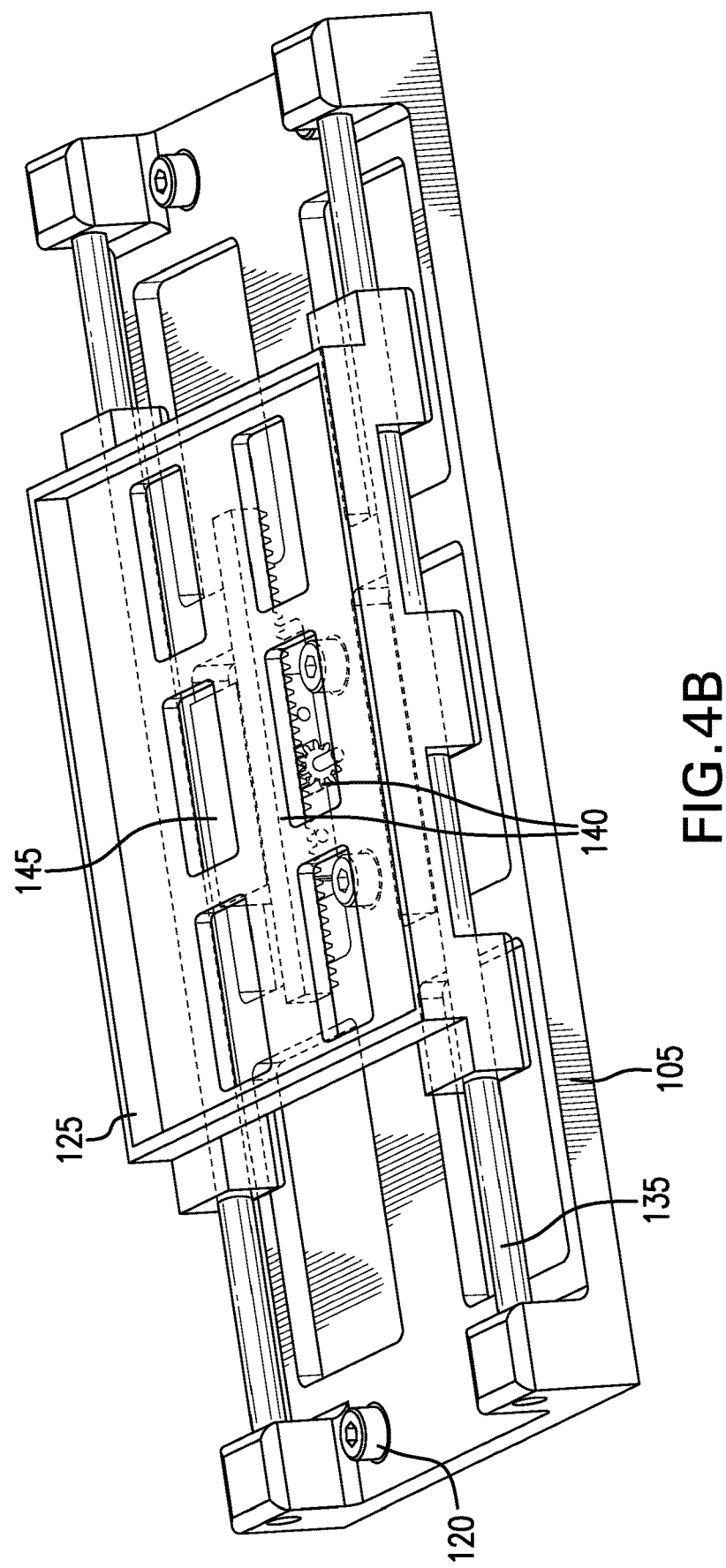

As can be seen in FIG. 4B, the rack and pinon mechanism 140 allows the top chassis section 125 to move along the axis of the chassis. The motion can be controlled by the actuator 145 (e.g. motor), which can be seen in FIG. 4B. As with the examples of FIGS. 2-3, in the embodiment of FIGS. 4A-4B, the rack is fixed on the top chassis section 125 and the pinion is stationary on the actuator's shaft. The rack and pinion mechanism translates the rotational motion provided by the motor to a linear motion. In certain embodiments, this same mechanism can be nested in a second rack and pinion mechanism (with a second actuator) so that motion in both the x and y axes (same plane) is allowed.

In one or more alternative embodiments, instead of a movable top chassis that moves one or more magnets to cancel the magnetic force of bottom magnets (e.g., embodiments of FIGS. 2-3) or to change the magnetic force of chassis (e.g., embodiment of FIGS. 4A-4B), the chassis can include one or more permanent switchable magnets that are fixed in the chassis and are configured to selectively change their magnetic state ("on" or "off"), and thereby change the magnetism of the chassis.

Figure 5A:
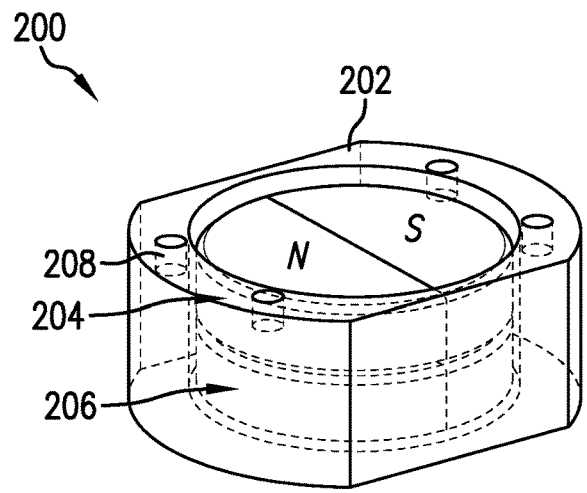
FIGS. 5A-5C show diagrams of generic permanent switchable magnets in accordance with one or more embodiments.
Figure 5B:
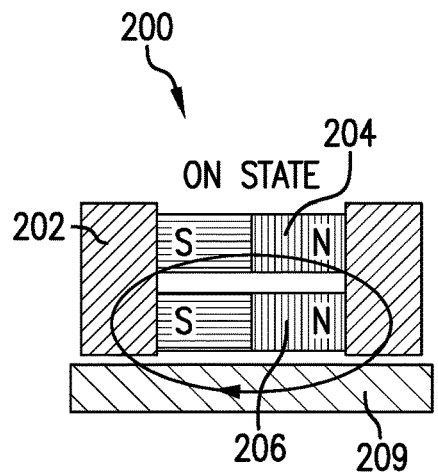
Figure 5C:
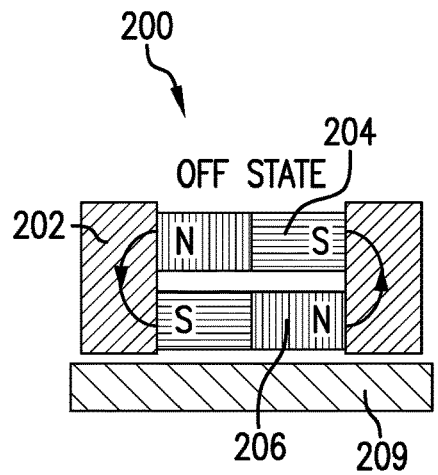

FIGS. 5A-5C display generic permanent switchable magnets 200 in accordance with one or more embodiments. The permanent switchable magnets 200 are devices that are capable of being turned "on" into a highly magnetic state or being switched completely "off" (not magnetic state). As shown in FIG. 5A, these devices typically include a metallic housing 202, a moving magnet 204, a fixed magnet 206, and a switching tool 208. The two magnets (moving magnet 204 and fixed magnet 206) are identical in properties and overlaid on top of each other. The only difference between these magnets is that the moving magnet 204 can be selectively rotated 180 degrees by the switching tool 208, and the fixed magnet 206 remains fixed in place. As shown in FIGS. 5B-5C, when the pair of magnets 204 and 206 have the same orientation, the switchable magnet 200 is in a highly magnetic ("on") state. In other words, in the "on" state, the two magnets 204 and 206 act as a large single magnet where the magnetic flux will travel from the north poles to the south poles through the metallic housing passing through the engaged travelling surface 209 (magnetically conducting surface) resulting in the magnetic attraction. In order for the switchable magnet 200 to be engaged to a magnetically conducting surface 209, the magnet flux has to pass from the north pole to the south pole through the surface 209 (FIG. 5B).

Conversely, when the switching tool 208 is used to rotate the moving magnet 204 such that it has an opposite orientation relative to the fixed magnet 206, the switchable magnet 200 is in a non-magnetic ("off") state. In the "off" state, the poles of the magnets 204 and 206 are in the reverse orientation where the top magnet's (moving magnet 204) north pole is on the top of the bottom magnet's (fixed magnet 206) south pole and the top magnet's south pole is on the top of the bottom magnet's north pole. This orientation causes the magnetic flux coming through the north pole of the moving magnet 204 to go to south pole of the fixed magnet through the metallic housing. In the same way, the magnetic flux emanating from the north pole of the fixed magnet 206 travels through the metallic housing to the south pole of the moving magnet 204. Consequently, the magnetic flux movement will be restricted to the magnets and the metallic housing, causing the switchable magnet 200 to not have an overall magnetism. The two magnets are effectively canceling each other.

Figure 6:
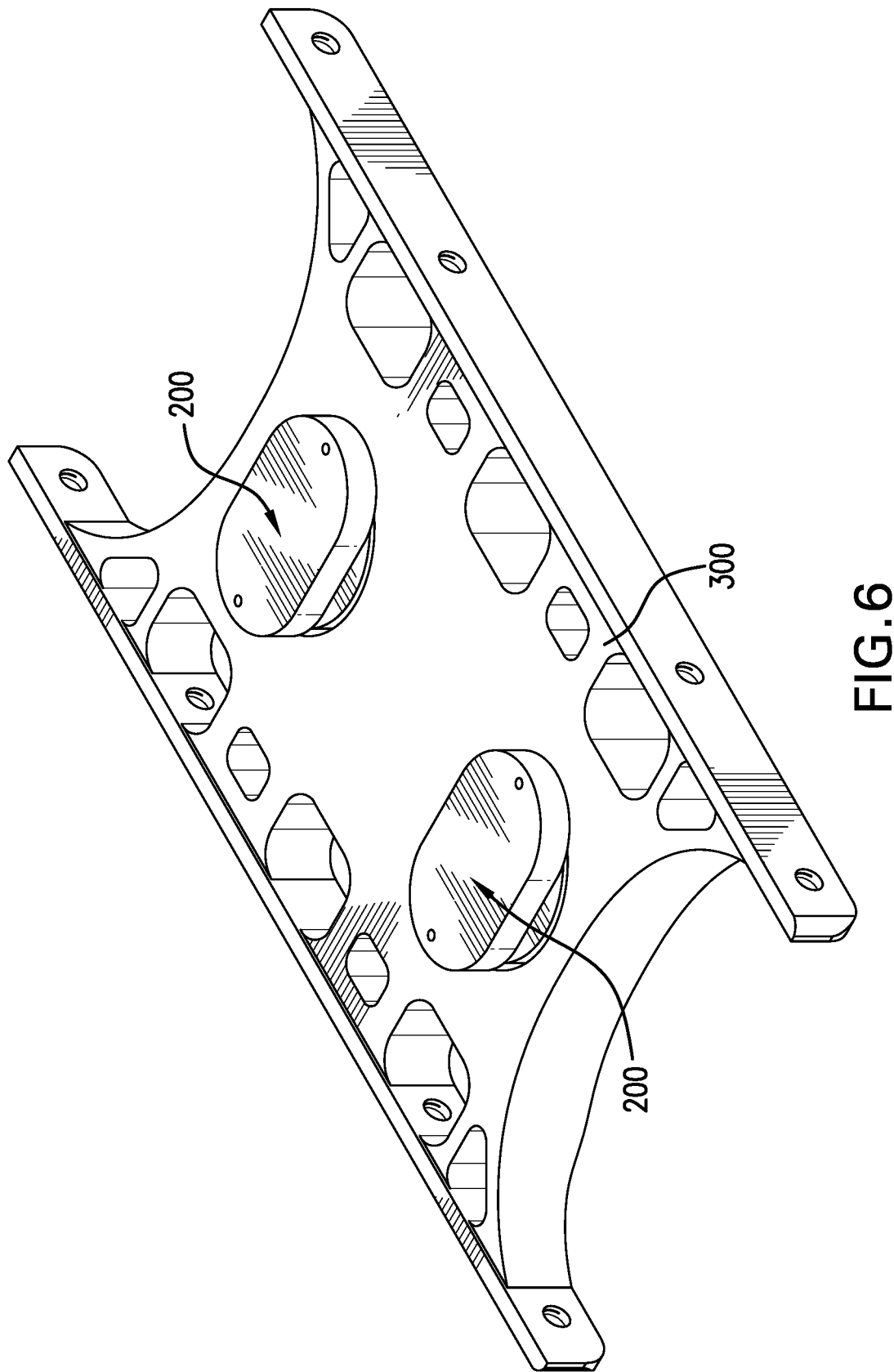
FIG. 6 shows a diagram of an exemplary chassis of a robotic wheeled vehicle, including at least one permanent switchable magnet in accordance with one or more embodiments.

FIG. 6 shows and exemplary chassis 300 of a vehicle including two switchable magnets 200 in accordance with one or more embodiments. In this embodiment, the permanent switchable magnets replace the sliding or skidding mechanism on the chassis. The switching tool of the permanent switchable magnets 200 can be actuated by an actuator, such as a stepper motor. In the embodiment of FIG. 6 that includes two permanent switchable magnets 200, there are four possible magnet states for the chassis 300. In a first state, both switchable magnets 200 are "on" such that magnetic flux passes through the magnetic surface for both switchable magnets 200. This first state is typically used in scenarios in which the vehicle is travelling over a smooth surface and without obstacles. In a second state, both switchable magnets 200 are "off" such that the moving magnet and fixed magnet of each switchable magnet 200 cancel each other out, resulting in neither switchable magnet 200 have an overall magnetism. This second state is typically used in scenarios when the vehicle needs to detach from the magnetic surface. The third and fourth states are when one of the switchable magnets 200 is "on" and the other is "off". In these two states, the end of the chassis in which the switchable magnet 200 is "on" exhibits magnetic attraction to the surface, while the end of the chassis in which the switchable magnet 200 is "off" does not.

To dynamically change the magnetism of the chassis of the robotic vehicle in this embodiment, control signals can be transmitted to the actuators (e.g., stepper motor) and the switching tool of each switchable magnet 200 by the adaptive control system to selectively control the state of each permanent switchable magnet 200. In one or more embodiments, the switchable magnets 200 are housed within a holding cavity 212 of the chassis. In at least one embodiment, the location of the holding cavity 212 can be adjustable along a length or width of the chassis. As such, in at least one embodiment, the holding cavity can also be selectively moved (e.g., via an actuator controlled by the adaptive control system) in one or more directions to further increase the positional range of the switchable magnets 200.

Adaptive Control System

As alluded to above, the chassis of the present application can be dynamically magnetized via control signals from an adaptive control system (adaptive control mechanism) that can selectively adjust the location or state of the magnets implemented in the chassis based on changes coming from external factors. The external factors include, but are not limited to, wheel slip, changes in pressure, and tilt and orientation angles, which can be measured by one or more sensors. The adaptive control system can be implemented using one or more computing devices.

FIG. 7 displays a conceptual perspective view representation of an exemplary adaptive control system 350 for dynamically magnetizing the chassis of a robotic vehicle in accordance with one or more embodiments. The adaptive control system 350 includes at least one computing device 400 that can be in communication with or configured to receive data from one or more sensors. As shown in FIG. 7, sensors can include, for example and without limitation, proximity sensors 355, wheel slip sensors 360, air pressure sensors 365, and inertia measurement units 370. In one or more embodiments, proximity sensors 355, wheel slip sensors 360, air pressure sensors 365, and inertia measurement units 370 are mounted to the robotic vehicle for measuring external factors of the robotic vehicle. For example, a proximity sensor 355 can be mounted to the robotic vehicle under the chassis near each wheel of the vehicle to measure pressure exerted on wheels. The adaptive control system 350 also includes one or more actuators 145 mounted to the robotic vehicle and configured move the chassis or the magnets (e.g. via a rack and pinion mechanism). In one or more embodiments, at least one computing device 400 can also be mounted to the robotic vehicle. While not shown, computing device 400 can also be operatively connected to other devices used for data collection such as computers used for manual calibration of the robotic vehicles. The actuators 145 and sensors can be operatively connected one or more computing devices 400 via a network 375. The network 375 can be, but is not limited to, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

As used herein, "adaptive control" is the capability of the control system to modify its own operation to achieve a consistent mode of operation. Specifically, the adaptive control system 350 can provide continuous information about the present state of the robotic vehicle, compare the present state of the robot to the desired or optimum state of the robot, and then make decisions and initiate proper modifications to drive the control system to its optimum desired state. In one or more embodiments, the "optimum desired state" of the robotic vehicle is maximizing attraction and stability of the robotic crawler as it travels along varying magnetic surfaces. For example, the robotic vehicle with the magnetized chassis of the present application can traverse different types of magnetic surfaces and different obstacles on the magnetic surfaces, and these variations in the magnetic surface can require modifications to magnets in the chassis to maintain magnetic attraction between the chassis and the surface. Obstacles and variations in the magnetic surface can include, but are not limited to, slanted surfaces, surfaces of a circular profile, gaps in the surfaces, offsets, surfaces with 90-degree transitional angles (e.g., from ground to a vertical wall).

With continued reference to FIG. 7, as the robotic vehicle encounters variations in the surface, one or more of the sensors 355-370 periodically take measurements of external factors of the robotic vehicle (e.g., wheel slip, changes in pressure exerted on wheels, changes in tilt and orientation angles of the vehicle) and then send these measurements to the computing device(s) 400 (e.g., microcontroller). The processor of the computing device 400 is then configured to analyze the measurements to determine if adjustments to the magnetized chassis need to be made to maintain the magnetic attraction of the chassis to the surface and thus the stability of the robotic vehicle as it traverses the surface. If the processor determines, based on the received measurements, that modifications to the location or state of one or more magnets of the chassis needs to be changed to maintain attraction of the chassis to the surface, the processor is configured to send a signal to the actuator 145 to move one or more magnets or change the state of one or more magnets.

An exemplary flow diagram of a method for dynamically magnetizing a chassis of a robotic wheeled vehicle traveling along a magnetic surface is shown at FIG. 8. In one or more embodiments, the method is performed using the adaptive control system of FIG. 7 and the robotic vehicle comprising a magnetized chassis of the present application.

With reference to FIGS. 7 and 8, the method 800 begins at step S805, where one or more sensors of the robotic vehicle are configured to measure at least one external factor of the vehicle, as discussed above. The robotic vehicle can include the computing device 400 (e.g., a microcontroller) having a processor and the processor can be configured to send a signal to the sensors to cause the sensors to measure the external factors. The processor can be configured to send the signal to the sensors by executing one or more software modules, such as a measurement module, data capture module, or communications module. In at least one embodiment, the computing device 400 can be separate from the robotic vehicle, but able to receive and transmit signals to the sensors or actuators of the vehicle.

At step S810, the measurements collected by the sensors are sent from the sensors to the computing device 400. Specifically, upon measurement of the external factors, the processor of the computing device 400 is configured to receive a signal comprising the measurements from the sensors. The processor can be configured to receive the signal from the sensors by executing one or more software modules, such as a measurement module, a data capture module, or a communications module. Then, at step S815, the processor of the computing device 400 is configured to analyze the measurements of the sensors.

At step S820, the processor of the computing device 400 is configured to determine whether the magnetized chassis of the present application needs to be adjusted based on the measurements of the at least external factor of the robotic vehicle. The processor can be configured to make this determination by executing one or more software modules, such as a measurement module or magnet control module. In one or more embodiments, the processor may determine, based on the received measurements, that adjustments to one or more magnets of the chassis are needed to maintain the magnetic attraction of the chassis to the magnetic surface and thus maintain the stability of the robotic vehicle as it traverses the surface. If it is determined that adjustment of the chassis is not needed, then the method can return to step S805 or if the robotic vehicle is parked or turned off, the method ends (step S830).

If it is determined that an adjustment to the magnetic chassis is needed at step S820, then at step S825 the processor is configured to send a command or signal to the actuator of the magnetic chassis to cause the chassis to adjust the location or state of at least one magnet of the chassis. For example, in the embodiment of FIG. 2A, the processor is configured to send a signal to the actuator 145 to move the top chassis section 125 and the top magnet 130 via the rack and pinion mechanism 140 to a new location along the chassis such that the magnetic force on another portion of the bottom magnet 110 is canceled. Similarly, in the example embodiment of FIG. 5A-5C, the processor is configured to send a signal to the switching tool 208 to cause the moving magnet 204 to switch orientations such that the switchable magnet 200 switch from an "on" state to an "off" state or vice versa. The processor can be configured to make these adjustments to the magnets by executing one or more software modules, such as a magnet control module. At step S830, if the robotic vehicle is still traveling along the surface, the method restarts at step S805. If, however, the robotic vehicle is parked or is configured to power down, the method ends.

With reference now to FIG. 9, in one or more embodiments, the adaptive control system 350 (FIG. 7) includes a closed-loop feedback control mechanism. As exemplified in the block diagram of FIG. 9, the closed loop feedback control mechanism utilizes the concept of an open-loop system as its forward path (initial feeding path) but has one or more additional feedback paths between the input and output. For example, FIG. 9 shows a block diagram closed-loop feedback control mechanism for controlling the speed of the vehicle. However, it should be understood that, in one or more embodiments, additional feedback control mechanisms for other parameters (e.g., pressure applied on wheels by surface, tilt angle, or inertial measurements) that are organized in a similar fashion as shown in FIG. 8 can also be included in the adaptive control system 350. In this example, the desired speed of the robotic vehicle is the input into the system to the controller (e.g., computing device 400 of FIG. 7). The controller then sends a signal or command to a motor of the vehicle to cause the vehicle to move at the desired speed. Feedback entails that a portion of the output signal is returned back to the input (e.g., controller) to form part of the excitation of the system and corrects errors of initialization. Feedback signals can be received by the controller (computing device 400) from one or more sensors (e.g., sensor 355-370 of FIG. 7). For example, if a feedback signal from the inertia measurement unit indicates that external factors are causing the actual speed of the vehicle to not be the same as the desired speed, the controller can then be configured to send a modified signal to the motor to modify its operation to adjust to the external factors and thus achieve the desired speed. Thus, the feedback control mechanism, by design, automatically achieves and maintain the desired output condition by calculating an error factor and controlling input parameters to minimize the calculated error factor. So, the closed-loop feedback mechanism generally reduces errors, improve stability of unstable systems, enhance robustness against external disturbances to the process (e.g. weld beams, gaps, etc.) and produces a reliable and repeatable performance for the robotic vehicle.

FIG. 10 is a block diagram illustrating an exemplary configuration of hardware and software components of one or more computing devices 400 (e.g., controller, microcontroller) of the adaptive control system 350 (see FIG. 7), which is described in the present disclosure as controlling the various operations relating to selectively adjust the location or state of the magnets in a chassis to dynamically magnetize the robotic vehicle. With reference to FIG. 10, in accordance with one or more embodiments, the computing device 400 includes a processor 402 that is disposed on a circuit board 404. The circuit board can further include a memory 406, a communication interface 408, and a computer readable storage medium 410 that are accessible by the processor 402. The circuit board 404 can also include or be coupled to a power source (not shown) source for powering the computing device.

The processor 402 and/or the circuit board 404 can also be optionally coupled to a display 412, for visually outputting information to an operator (user), and a user interface 414 for receiving operator inputs. The processor 402 can also be operatively connected to an input/output interface 416 for receiving and outputting electronic signals to one or more connected devices (e.g. sensors) as would be understood by those in the art. As an example, the processor 402 can emit control signals to the actuator(s) of the chassis for moving the chassis sections or magnets of the chassis. Although the various components are depicted either independent from, or part of the circuit board 404, it can be appreciated that the components can be arranged in various configurations.

The processor 402 serves to execute software instructions that can be loaded into the memory 406. The processor 402 can be implemented using multiple processors, a multi-processor core, or some other type of processor. The memory 406 is accessible by the processor 402, thereby enabling the processor 402 to receive and execute instructions stored on the memory 406 and/or on the computer readable storage medium 365. Memory 406 can be implemented using, for example, a random-access memory (RAM) or any other suitable volatile or non-volatile computer readable storage medium. In addition, memory 406 can be fixed or removable.

The computer readable storage medium 410 can also take various forms, depending on the particular implementation.

For example, the computer readable storage medium 410 can contain one or more components or devices such as a hard drive, a flash memory, a rewritable optical disk, a rewritable magnetic tape, or some combination of the above. The computer readable storage medium 410 also can be fixed or removable or remote such as cloud-based data storage systems (remote memory or storage configuration not shown). The computer readable storage medium 410, for example, can be used to maintain a database 418, which stores information relating to the capture of measurement data, the dimensional calibration of respective structures and/or data used or generated while carrying out operations and implementing aspects of the systems and methods disclosed herein.

One or more software modules 420 are encoded in the memory 406 and/or the computer readable storage medium 410. The software modules 420 can comprise one or more software programs or applications having computer program code or a set of instructions executed by the processor 402. Such computer program code or instructions for carrying out operations and implementing aspects of the systems and methods disclosed herein can be written in any combination of one or more programming languages. While the software modules 420 are stored locally in computer readable storage medium 406 or memory 410 and execute locally in the processor 402, the processor 402 can interact with a remotely-based computing platform via the communication interface 408, and via a local or wide area network to perform calculations, analysis, control, and/or any other operations described herein.

During execution of the software modules 420, the processor 402 is configured to perform the various operations described herein, including without limitation, the steps for selectively changing the location or state of one or more magnets of the chassis of the robotic vehicle, as previously discussed. The software module 420 can include code for implementing the aforementioned steps and other steps and actions described herein, for example and without limitation: a measurement module 422, which configures the processor 402 to perform the various operations related to measuring external factors of the robotic vehicle (e.g., wheel slip, changes in pressure exerted on wheels, changes in tilt and orientation angles of the vehicle); a data capture module 424, which configures the processor 402 to perform the various operations relating to receiving measured parameters related to the external factors of the vehicle; a communication module 426, which configures the processor 402 to communicate with remote devices over a communication connection such as a communication network or any wired or wireless electronic communication or input/output interface; and a magnet control module 428, which configures the processor 402 to perform the various operations relating to changing the location or state of one or more magnets of the chassis of the robotic vehicle. The program code of the software modules 420 and one or more of the non-transitory computer readable storage devices (such as the memory 406 and/or the computer readable storage medium 410) can form a computer program product that can be manufactured and/or distributed in accordance with the present disclosure.

Although much of the foregoing description has been directed to systems and methods for dynamically magnetizing a chassis of a robotic vehicle, the systems and methods disclosed herein can be similarly deployed and/or implemented in scenarios, situations, and settings far beyond the referenced scenarios. It should be further understood that any such implementation and/or deployment is within the scope of the systems and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting.

Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for dynamically magnetizing a chassis of a robotic vehicle, the system comprising:
    a chassis comprising,
        a first chassis section comprising at least one magnet, wherein the first chassis section is fixed in position;
        a second chassis section comprising a magnet with an opposition orientation relative to the at least one magnet of the first chassis section, wherein the second chassis section is located above or below the first chassis section and wherein the second chassis section comprises a mechanism that configures the second chassis section to selectively move relative to the location of the at least one magnet of the first chassis section;
    an actuator operatively connected to the second chassis section; and
    a control system comprising a computing device that is operatively connected to the actuator, wherein the control system is configured, via the computing device, to send commands to the actuator to selectively move the mechanism, thereby selectively moving the second chassis section relative to the location of the at least one magnet of the first chassis section to activate or inactivate a magnetic force on a portion of the first chassis section.

2. The system of claim 1, wherein the control system further comprises at least one of:
    a proximity sensor under the chassis;
    an air pressure sensor;
    a wheel slip sensor; and
    at least one inertial measurement unit.

3. The system of claim 2, wherein the computing device of the control system is configured to send commands to the actuator to selectively move the second chassis section based on at least external factor of the robotic vehicle, wherein the at least one external factor is selected from: wheel slip as measured by the wheel slip sensor, changes in pressure exerted on wheels as measured by the proximity sensor or the air pressure sensor, and changes in tilt and orientation angles of the vehicle as measured by the at least one inertial measurement unit.

4. The system of claim 1, wherein the actuator is a stepper motor or another mechanism that outputs a linear motion or translates any type of motion to a linear motion.

5. The system of claim 1, wherein the first chassis section comprises one magnet.

6. The system of claim 1, wherein the first chassis section comprises two magnets or three magnets.

7. The system of claim 1, wherein the second chassis section is configured to move the magnet of the second chassis section horizontally, vertically, or both relative to the location of the at least one magnet of the first chassis section.

8. The system of claim 1, wherein the magnets of the chassis are permanent magnets.

9. The system of claim 1, wherein the first chassis section comprises at least two magnets and an insulation barrier between each of the at least two magnets.

10. The system of claim 1, wherein the mechanism is a rack and pinion mechanism.

11. A method for dynamically adjusting a magnetized chassis of a robotic vehicle traveling on a magnetic surface, wherein the vehicle comprises a chassis comprising at least one magnet, an actuator operatively connected to the chassis, and a control system comprising a computing device having a processor and at least one sensor, wherein the processor is configured to send, receive, and analyze signals from the at least one sensor and the actuator, the method comprising:
    measuring, with the at least one sensor, at least one external factor of the vehicle;
    transmitting, with the at least one sensor, the measurement of the external factor to the computing device;
    analyzing, with the computing device, the measurement of the at least one external factor;
    determining, with the computing device based the analyzed measurement of the external factor, whether the chassis requires adjustment; and
    adjusting, with the actuator based on a signal from the computing device, the chassis such that the location or state of the at least one magnet of the chassis is changed, wherein adjustment of the chassis changes the magnetic force of at least a portion of the chassis towards the magnetic surface.

12. The method of claim 11, wherein the at least one external factor is selected from: wheel slip, changes in pressure exerted on wheels, and changes in tilt and orientation angles of the vehicle.

13. The method of claim 11, wherein the at least one sensor is selected from: a proximity sensor, an air pressure sensor, a wheel slip sensor, and at least one inertial measurement unit.

14. The method of claim 11, wherein the chassis comprises a first section having a first magnet and a second section having a second magnet, and wherein the first magnet has an opposition orientation relative to the second magnet, and wherein the step of adjusting the chassis comprises:
    moving the second section of the chassis relative to the first section of the chassis to activate or inactivate a magnetic force on a portion of the first section.

15. The method of claim 14, wherein the first and second magnets are permanent magnets.

16. The method of claim 14, wherein the second section moves via a rack and pinion mechanism.

17. The method of claim 14, the second section is configured to move horizontally, vertically, or both relative to the first section.

18. The method of claim 14, wherein when the robot is traveling in a smooth motion state, the second magnet is centered in the middle of the chassis to allow equal attraction on both ends of the chassis.

19. The method of claim 11, wherein the at least one magnet of the chassis is a permanent switchable magnet.

20. The method of claim 11, wherein the actuator is a stepper motor or another mechanism that outputs a linear motion or translates any type of motion to a linear motion.

* * * * *